(12) United States Patent
Thorne

(10) Patent No.: US 9,798,464 B2
(45) Date of Patent: Oct. 24, 2017

(54) COMPUTING DEVICE

(71) Applicant: SONY CORPORATION, Tokyo (JP)

(72) Inventor: Samuel John Thorne, London (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/036,935

(22) PCT Filed: Dec. 23, 2014

(86) PCT No.: PCT/GB2014/053836
§ 371 (c)(1),
(2) Date: May 16, 2016

(87) PCT Pub. No.: WO2015/114289
PCT Pub. Date: Aug. 6, 2015

(65) Prior Publication Data
US 2016/0283106 A1 Sep. 29, 2016

(30) Foreign Application Priority Data

Jan. 31, 2014 (GB) .................................. 1401723.0

(51) Int. Cl.
*G06F 3/048* (2013.01)
*G11B 27/031* (2006.01)
(Continued)

(52) U.S. Cl.
CPC ........ *G06F 3/04886* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS 5,689,667 A    11/1997  Kurtenbach
5,926,178 A     7/1999  Kurtenbach
(Continued)

FOREIGN PATENT DOCUMENTS

CN    102073437 A    5/2011
EP    2 624 119 A1   8/2013
(Continued)

OTHER PUBLICATIONS

International Search Report issued Mar. 9, 2015, in PCT/GB2014/053836 dated Dec. 23, 2014.

*Primary Examiner* — Timothy J Henn
(74) *Attorney, Agent, or Firm* — Oblon, McClelland, Maier & Neustadt, L.L.P.

(57) ABSTRACT

A computing device including a touch sensitive screen to display a graphical representation of a user interface and a processor module configured to control the graphical representation in response to signals representing user interaction. The user interface includes an orbital touch control to move in angular and radial directions relative to a reference point in response to signals representing user interaction with the orbital touch control. The processor module further can generate, in response to the signals representing the user interaction with the orbital touch control, control signals controlling parameters associated with data received at the computing device. The control signals include an indication of a value of a first parameter dependent on an angular position of the orbital touch control relative to the reference point and a value of a second parameter dependent on a radial position of the orbital touch control relative to the reference point.

22 Claims, 23 Drawing Sheets

(51) Int. Cl.
*H04N 5/232* (2006.01)
*G06F 3/0488* (2013.01)
*G06F 3/0482* (2013.01)
*G06F 3/0484* (2013.01)

(52) U.S. Cl.
CPC ........ *G06F 3/04847* (2013.01); *G11B 27/031* (2013.01); *H04N 5/23203* (2013.01); *H04N 5/23216* (2013.01)

(56) References Cited

U.S. PATENT DOCUMENTS

| | | |
|---|---|---|
| 6,618,063 B1 | 9/2003 | Kurtenbach |
| 2004/0095395 A1 | 5/2004 | Kurtenbach |
| 2004/0263476 A1* | 12/2004 | Lim ................ G08B 13/19682 345/157 |
| 2005/0010955 A1 | 1/2005 | Elia et al. |
| 2006/0025218 A1* | 2/2006 | Hotta ...................... A63F 13/06 463/37 |
| 2006/0161871 A1 | 7/2006 | Hotelling et al. |
| 2007/0242057 A1 | 10/2007 | Zadesky et al. |
| 2007/0276525 A1 | 11/2007 | Zadesky et al. |
| 2008/0018615 A1 | 1/2008 | Zadesky et al. |
| 2008/0059913 A1 | 3/2008 | Burtner et al. |
| 2009/0083665 A1 | 3/2009 | Anttila et al. |
| 2009/0187860 A1 | 7/2009 | Fleck et al. |
| 2009/0327955 A1 | 12/2009 | Mouilleseaux et al. |
| 2010/0023862 A1* | 1/2010 | Tai ................... G06F 17/30247 715/721 |
| 2011/0019058 A1* | 1/2011 | Sakai .................. G06F 3/04847 348/333.01 |
| 2011/0304584 A1 | 12/2011 | Hwang et al. |
| 2012/0036434 A1 | 2/2012 | Oberstein |
| 2013/0069987 A1* | 3/2013 | Choe ..................... G06F 3/0488 345/649 |
| 2013/0162172 A1 | 6/2013 | Baaijens et al. |
| 2013/0194217 A1 | 8/2013 | Lee et al. |
| 2014/0245226 A1* | 8/2014 | Butscher ............. G06F 3/04847 715/834 |

FOREIGN PATENT DOCUMENTS

| | | |
|---|---|---|
| GB | 2014/053836 | 12/2014 |
| WO | WO 2004/104773 A2 | 12/2004 |
| WO | WO 2008/104862 A2 | 9/2008 |
| WO | WO 2013/049864 A1 | 4/2013 |

\* cited by examiner

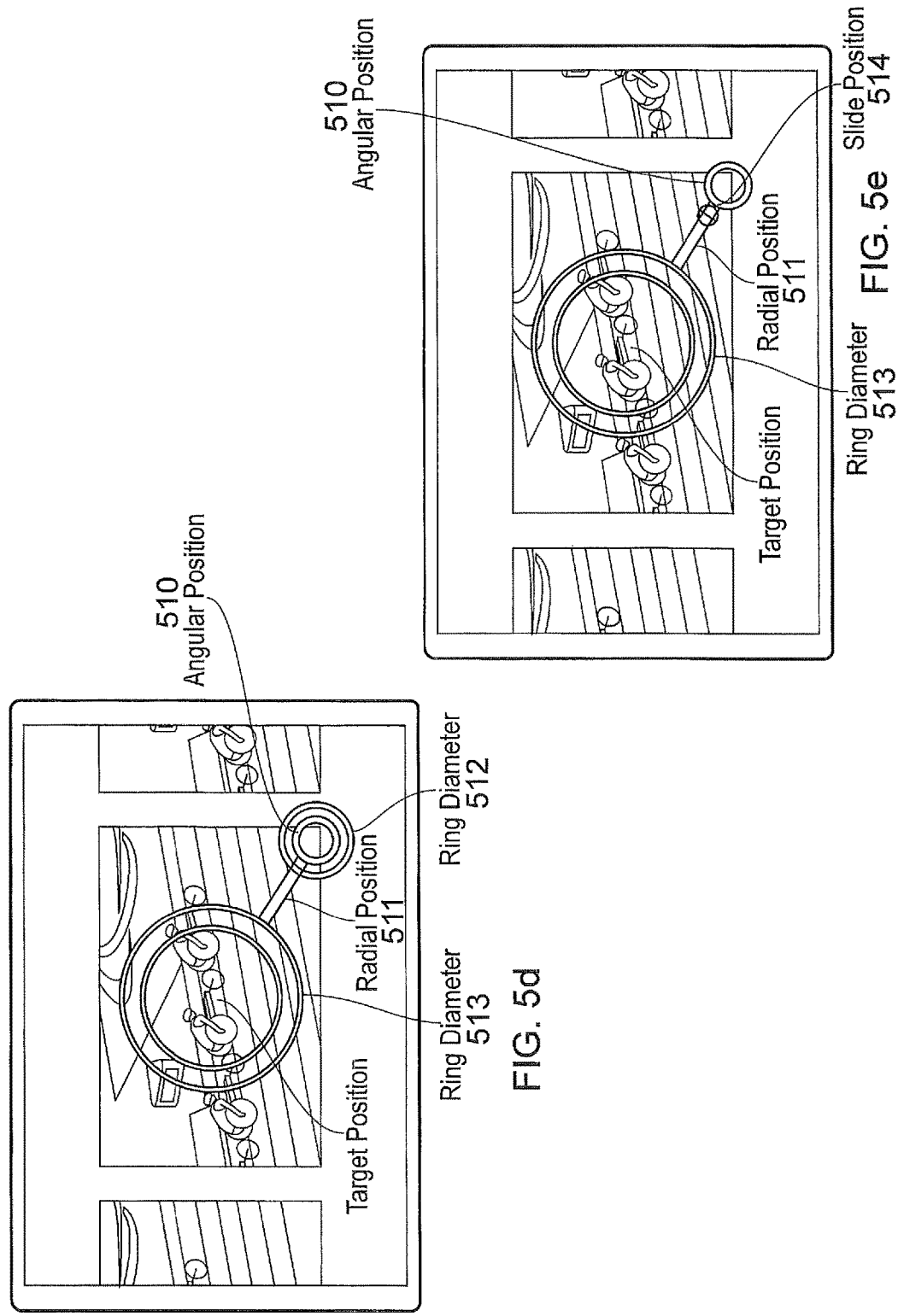

COMPUTING DEVICE

FIELD OF THE DISCLOSURE

The present disclosure relates to computing devices, video processing systems and methods of generating of control signals for adjusting a first parameter and a second parameter associated with data.

BACKGROUND OF THE DISCLOSURE

Touch screen displays provide a highly adaptable means for providing user interfaces through which users can control electronic computing devices. Unlike conventional physical interfaces such as keyboards and mice, a touch screen display can provide a fully adaptable user interface. Furthermore, space which in the past may have to be dedicated to a physical keyboard can now form part of the screen and thus used to display additional content and utilised to display a user interface such as a keyboard only when required. As a result of the adaptability of touch screen displays and their efficient use of space, they are anticipated to form the basis of the majority of user interfaces on portable electronic devices in the near future. For example, tablet computing devices and smartphones almost exclusively use touch screen displays as the basis of their user interfaces.

As a result there has been an increase in user interface techniques which allow a user to provide a variety of commands using the touch screen. For example, multi-touch touch screen technologies allow for multiple simultaneous touches to be detected and interpreted. These can for example include pinching and zooming and swiping with multiple fingers.

As will be appreciated, ways in which a user may interact with a multiple touch screen with single hand can be limited by a difficulty in performing substantially different movements with the fingers of a single hand. Consequently, single hand interactions with touch screen devices are often limited.

SUMMARY OF THE DISCLOSURE

According to an example of the present disclosure there is provided a computing device comprising a touch sensitive screen configured to display a graphical representation of a user interface and to provide a processor module with signals representing user interaction with the touch sensitive screen. The processor module is configured to control the graphical representation of the user interface in response to the signals representing the user interaction and the user interface includes an orbital touch control. The orbital touch control is configured to move in an angular direction and in a radial direction relative to a reference point in response to signals representing user interaction with the orbital touch control, and the processor module is configured to generate, in response to the signals representing the user interaction with the orbital touch control, control signals for controlling parameters associated with data received at the computing device. The control signals include an indication of values of a first and of a second of the parameters, the value of the first parameter being dependent on an angular position of the orbital touch control relative to the reference point and the value of a second parameter being dependent on a radial position of the orbital touch control relative to the reference point.

Although touch screen displays can provide an increased level of adaptability, they also present a number of limitations on how a user may interact with a computing device. The majority of devices that incorporate touch screen displays are designed as handheld devices where one hand is used to support the device and the other hand is used to interact with the device using the touch sensitive display screen. However, the use of one hand to support the device limits a user's ability to interact with the touch screen. The use of an orbital touch control for the adjustment of a first and a second parameter enables two parameters to be simultaneously adjusted with a single touch based input. This therefore reduces the number of user inputs required compared to existing touch based parameter control user interfaces, thus simplifying both the processing involved in providing an interface for parameter control but also reducing the need for multi-touch touch screens, which in turn may reduce device complexity and application programming complexity. The orthogonality of the radial and angular axis also allows for the use of intuitive movements to simultaneously adjust parameters. This in turn increases the rate at which multiple parameters can be simultaneously adjusted by a user, thus making the orbital touch control suitable for use in real-time parameter adjustment scenarios.

In one example the data includes one or more images captured by one or more image capturing devices and the parameters correspond to first and second parameters of the image capturing devices. The image capturing devices are configured to generate and to communicate to the computing device signals representing the captured images, and the computing device is configured to receive the signals representing the captured images and transmit the control signals to the image capturing devices. The image capturing devices are configured to adjust the first and second parameters of the image capturing device dependent on the control signals.

The use of an orbital touch control for the control of imaging capturing apparatus allows parameters of images which may not be able to be altered via post-processing techniques to be adjusted. The angular and radial movements of the orbital touch control may also correspond to the physical movements that may be used to alter the parameters on the image capturing apparatus. Therefore the orbital touch control may provide an intuitive means to control image capturing apparatus parameters. For instance, the focus of a camera may be controlled via angular movement of the orbital touch control in an analogous manner to the rotation of a lens barrel of a camera.

In another example the data includes one or more images and the processor module is configured to adjust the first and second parameters of the one or more images dependent on the control signals.

Adjustment of the image parameters directly by the computing device obviates the need for control signals to be transmitted to image capturing apparatus, thus reducing the communications between the computing device and the image capturing devices.

In another example the control signals include an indication of a predetermined temporal period over which the parameters are to be adjusted.

In another example the user interface comprises a second orbital touch control configured to move relative to the reference point, the angular position of the second orbital touch control relative to the reference point representing a pre-adjustment value of the first parameter and the radial position of the orbital touch control relative to the reference point representing a pre-adjustment value of the second parameter.

The provision of two orbital touch controls provides a user of a graphical user interface with an indication of the current and adjusted values of the parameters concerned. Consequently the user is provided with an improved indication of the absolute and proportional size of the parameter adjustment compared to the current values. Furthermore, when combined with a parameter adjustment over a predetermined temporal period an accurate indication of the rate of parameter transition may be provided to the user.

In another example the reference point forms a central point of an aperture in the user interface and a portion of one of the one or more images is displayed within the aperture, the displayed portion having parameters adjusted in accordance the parameter values indicated in the control signals.

The provision of a portion of the adjusted image provides the user with a direct comparison between adjusted and non-adjusted images therefore enabling more accurate parameter adjustment.

In another example the one or more images form one or more video streams.

The use of an orbital touch control for the adjustment of first and second parameters of video streams allows real-time video streams to be edited and provided to viewers by virtue of the intuitiveness and speed at which multiple parameters can be adjusted using the orbital touch control. Existing techniques may require consecutive inputs to be used in order to adjust multiple parameters and may therefore introduce unacceptable delays when used for real-time video editing. The simultaneous adjustment of parameters made possible by the orbital touch control significantly reduces any editing delays such that real-time edited video of an event may be provided to viewers.

Various further aspects and embodiments of the disclosure are provided in the appended claims, including but not limited to a video processing system and a method of generating of control signals for adjusting a first parameter and a second parameter associated with data.

BRIEF DESCRIPTION OF THE DRAWINGS

Embodiments of the present disclosure will now be described by way of example only with reference to the accompanying drawing in which like parts are provided with corresponding reference numerals and in which:

FIGS. 5a to 5e provide illustrations of an example parameter control interface in accordance with the present disclosure;

DETAILED DESCRIPTION OF EXAMPLE EMBODIMENTS

Touch Screen Computing Device

Figure 1A:
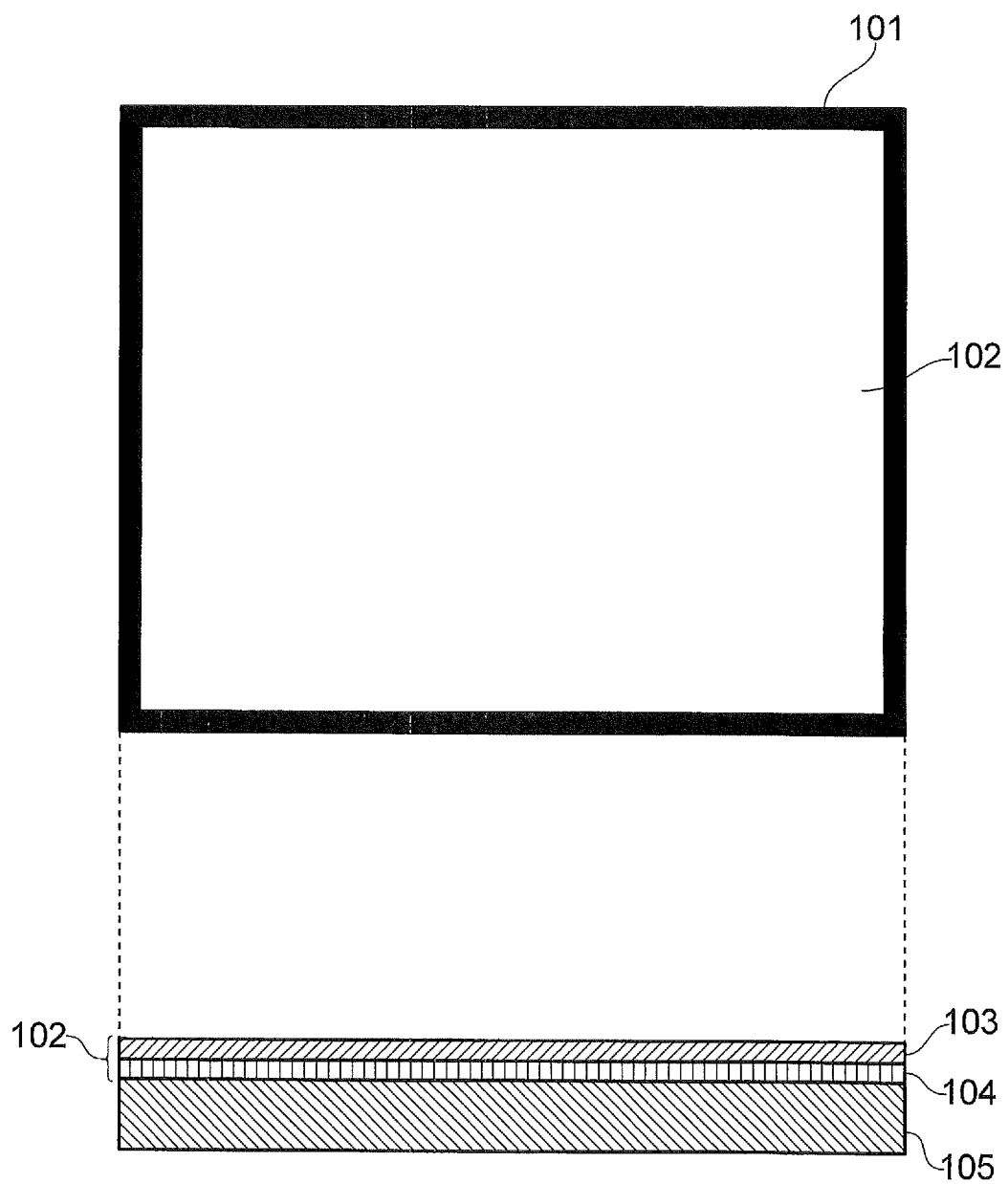
FIG. 1a provides an illustration of a conventional tablet computing device.

FIG. 1a provides a simplified illustration of a conventional touch screen computing device 101 from a plan perspective and a cross-sectional perspective, where the computing device may for example be a tablet computer or a smartphone. From the plan perspective the touch screen computing device comprises a touch screen display 102 which the user of the computing device utilises to view images, graphical user interfaces and the like and to interact with the computing device. From the cross-sectional perspective the computing device is shown to be formed from the touch sensitive display 102 and a housing 105, where the touch sensitive display 102 is formed from an input module 103 and a display module 104 layered on top of one another. The input module 103 is formed from a two dimensional touch sensor, which generates signals in response to sensing a user's touch indicating two dimensional coordinates on the touch sensor of the location of the user's touch. The housing of the computing device encloses the other components necessary for the functioning of the computing device, such as a processing module, an interface module and a battery for example. The input module 103 is operable to sense user touch input and provide an indication of the user input to a processing module, where the input module may for example be implemented using capacitive, resistive or infra-red touch sensing techniques. The input module may also be operable to detect single touches and or multiple simultaneous touches by a user. The display module is operable to display images represented by signals received from a processor or graphics module and may for example be a liquid crystal display or an organic light emitting diode display. The input module may be transparent and disposed on top of the display module in order to improve the sensing capabilities of the device, and a protective transparent layer such as glass or plastic may be disposed on top of the input module.

Figure 1B:
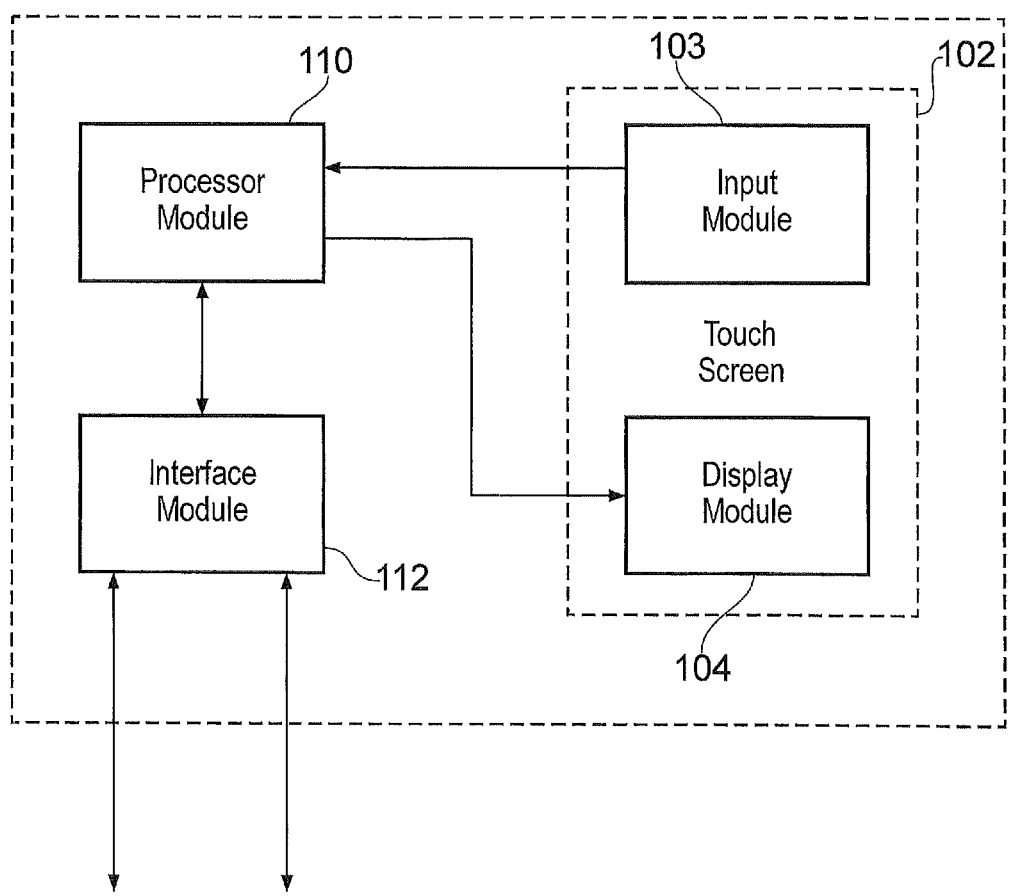
FIG. 1b provides an illustration of a conventional tablet computing device.

FIG. 1b provides a simplified schematic diagram of the internal structure of the touch screen computing device of FIG. 1a. As described above, the computing device comprises the input module 103 and the display module 102. The input module and the display module are communicatively linked to the processor module 110 which is operable to receive an indication of user input from the input module in the form of touch coordinates relative to the display, interpret the user input in light of the graphics currently displayed and respond to the user input by altering the graphics displayed by the display module. In this manner images, videos and graphical user interfaces may be displayed and interacted with by a user. For example, if a moveable element is displayed, upon reception of touch coordinates at the processor module that coincide with coordinates of the moveable element, the processor may interpret this as a user touching the moveable element. The processor module may then generate and communicate control signalling to the display module in order for the display module to display graphics in accordance with the user interaction, such that the moveable element appears to be moving in reaction to the users touch input. Accordingly, together the input module and the display module form the touch sensitive screen or display 103, where the processor module provides the interface between the input module and the display module required to provide an interactive touch screen that is capable of providing a graphical user interface The processor module and other modules may be implemented in hardware such as analogue or digital circuitry, software running on a multipurpose processor or a mixture of both hardware and software implementations. Furthermore, although illustrated as a single module, the processor module may be formed from plurality of modules such as a central processing module, a graphical processing module and a memory module for example. A variety of software and applications formed from computer executable instructions may be executed by the processor module in order to provide different functionality to the touch screen computing device. For instance, file stored on the computing device or a remote server may be browsed, games may be played and images and videos may be presented and edited via the execution of software and interaction from the user.

The touch screen computing device may also comprise an interface module 112 communicatively linked to the processor module and which is operable to send and receive signals representing data from external devices and networks. The interface module may therefore transmit and receive signals representing computer executable instructions, images, videos, text documents and control signals for example. In a similar manner to the processor module, the interface module may be implemented in hardware such as analogue or digital circuitry, software running on a multipurpose processor or a mixture of both hardware and software implementations. Although a specific example of a touch screen device is illustrated in FIGS. 1*a* and 1*b*, many other implementations and arrangement of modules is possible whilst maintaining the general functionality of a touch screen computing device.

Figure 1C:
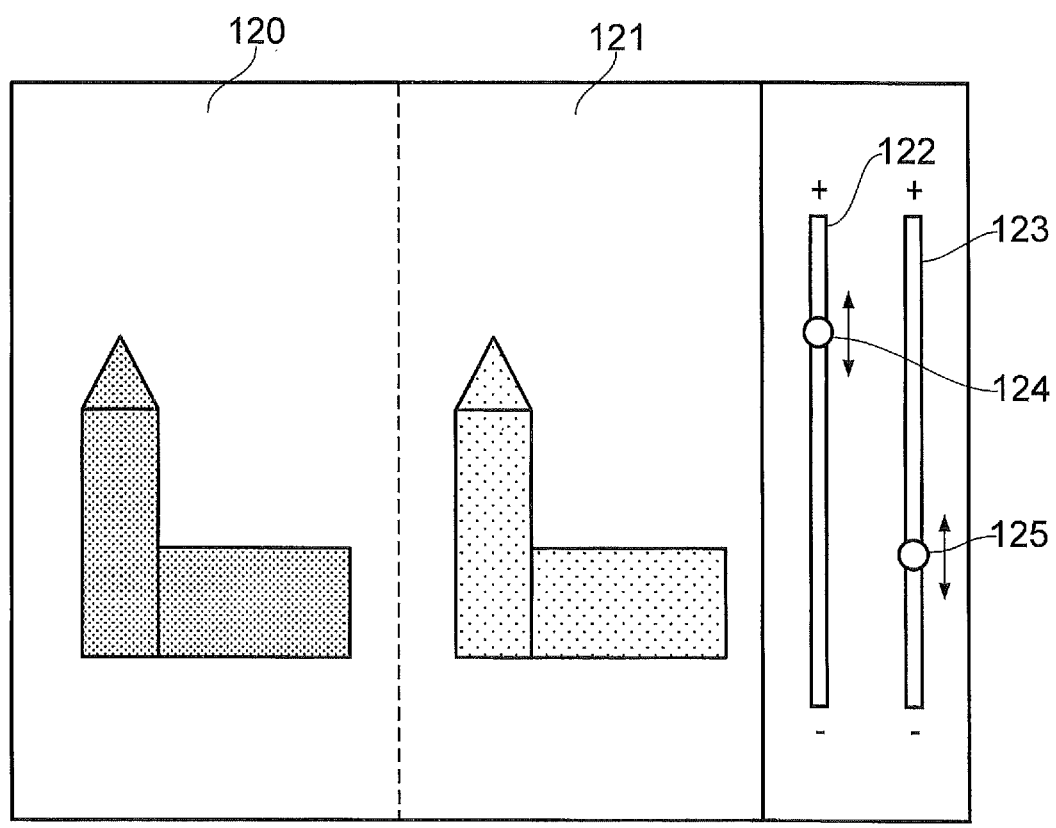
FIG. 1c provides an illustration of a conventional parameter control interface.

FIG. 1*c* provides an example of a conventional graphical user interface that may be displayed on a touch screen computing device 101 and that may be used to control parameters associated with images and videos. In FIG. 1*c* the screen 102 is configured to display a graphical user interface which includes an original image 120, a preview or an adjusted image 121, and a set of control bars 122 and 123. The controls bars 122 and 123 may be used to adjust properties of the images via movement of the dials 124 and 125 up and down the respective control bars. For instance, the control bars may be used to adjust the contrast of the images and the saturation of the images, where movement of the dials towards the minus sign represents reduced contrast and saturation and move the dials towards the plus sign represents increased contrast and saturation. In FIG. 1*c* the contrast of image 121 has been reduced compared to the original image 120. This form of control interface in a graphical user interface provides an adequate interface for users when there are a number input gesture formats available, for instance a mouse and a keyboard, or multi-touch input. However, there are a number of disadvantages associated with such approaches to control interfaces. Firstly, due to the duplicated images, the size of detail of each image is reduced and therefore the user may not be able to ascertain accurately how the changing parameters are affecting the image. This reduced image size is also exacerbated by the presence of the control bars which further reduce the screen space available to display the images. Secondly, as a result of such control interfaces having been developed when touch screen devices we relative scarce and not widely used, such an interface is poorly adapted for use with touch screen technology. For instance, if a user is holding a tablet computing device they may be unable to simultaneous adjust the parameters represented by the control bars thus resulting in reduced functionality and a degraded user experience. Likewise, if a touch screen is not arranged to accept multi-touch input it will not be possible to adjust two or more parameters simultaneously. Consequently, if such interfaces are to be used for substantially simultaneous parameter adjustment, multi-touch input will be required which will in turn increase the cost of touch screen displays and increase the complexity for coding programs to be used on the displays. Thirdly, restricting the controls to linear movement may not provide an intuitive interface when the parameters being controlled do not easily relate to linear movements. Although alternative user interfaces are available such as those that allow for entering numerical values or combined x-axis and y-axis adjustment as commonly found in colour adjustment interfaces, these often experience similar problems to the interface of FIG. 1 or further problems. For instance, an inability to control the parameters accurately or a lack of intuitiveness between the forms of the controls and the parameters which are being controlled. Added to this, although multi-touch touch sensitive screens allow for multiple simultaneous inputs, such displays are typically more expensive to manufacture and require more complex processing in order to discriminate between each of the multiple touches.

Orbital Touch Control

Figure 2A:
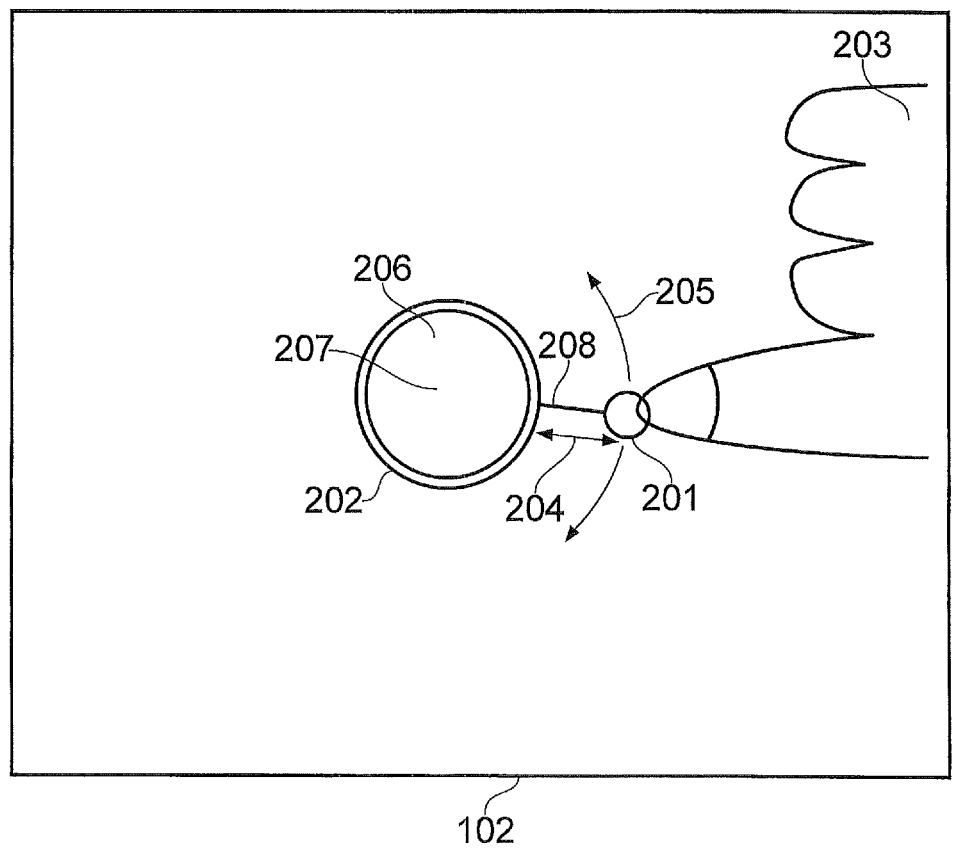
FIGS. 2a to 2c provide illustrations of an example parameter control interface in accordance with the present disclosure.

FIG. 2*a* provides an illustration of a control interface in accordance with the present disclosure, where the control interface is primarily intended for use with touch screen or touch sensitive devices such as those described above for example. The control interface includes an orbital touch control 201 and a central ring 202, where the orbital touch control is configured to be controlled via a single touch input from a user's finger or stylus 203. The orbital touch control is configured to move in both a radial direction 204 and an angular or circumferential direction 205 relative to a central point 207 of the central ring 202 in an analogous manner to an orbiting planet, where the central point may also be referred to as a reference point, centre point or pole. The radial and angular movement directions are orthogonal as may be found in two-dimensional polar coordinates systems. When the orbital touch control is displayed, upon reception of touch coordinates at the processor module that coincide with coordinates of a displayed orbital touch control, the processor may interpret this as a user touching the orbital touch control. The processor module is then operable to generate and communicate control signalling to the display module to move the orbital touch control in accordance with the user input.

The position of the orbital touch control in each axis relative to the central ring or reference point may be used to represent a value of a parameter associated with selected data such as an image(s), parameters associated with image capturing apparatus or searching parameters for a database for example, whereby two parameters may be represented/controlled by each of one or more orbital touch controls. For example, when an orbital touch control is first displayed its position in each axis with respect to the reference point may represent the current value of two parameters associated with the selected data. Any subsequent movement of the orbital touch control by the user then represents a change in the values of the parameters. Upon movement of the orbital touch control as described above, control signals indicating the changing values of the parameters may be generated by the processor module and communicated to the appropriate destination for adjustment of the parameters, which may either be internal or external to the computing device. For instance, any parameter adjustments resulting from movement of the orbital touch control may be applied to the selected data by the processor module or in a distributed manner by a remote server to which the computing device is communicatively linked via the interface module. For example, with respect to image parameters, a position in the radial axis may represent image contrast and a position in the circumferential axis may represent image saturation such that movement of the orbital touch control in the clockwise direction represents an increase in saturation and movement of the orbital control away from the central point represents an increase in contrast. The control signals indicating the image parameter adjustments may then be generated by the processor module and transmitted to be appropriate destination where the newly adjusted parameters are applied to the images.

In some examples the central ring 202 may not be displayed and movement of the orbital touch control is with respect to the reference point 207. In other examples the central ring 202 may define an aperture 206 in which additional information concerning the parameters represented by the orbital touch control or a preview of the effects of changing the parameters may be displayed. It is also not required that the ring be circular and in some examples may annular, oval or include one or more straight sides. Although the examples given above refer to parameters associated with images, the orbital touch control interface may be used to control any parameters associated with data. For example, if a user wishes to browse documents from a certain period of time the orbital touch control may be used to adjust the browsing criteria by equating the radial position to a day of the week that documents were created and equating the angular direction to a week of the year that documents were created. By displaying documents according to the selected week and day of the week, a user is therefore able to quickly browse through documents according to their date of creation by movement of the orbital touch control. In other examples the interface maybe used to set the time of a clock by controlling hours via radial movement and controlling minutes by angular movement or vice versa.

Figure 2C:
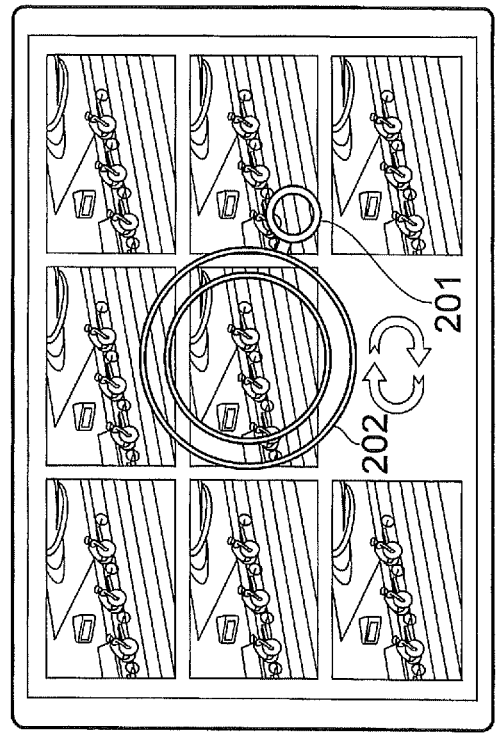
Figure 2B:
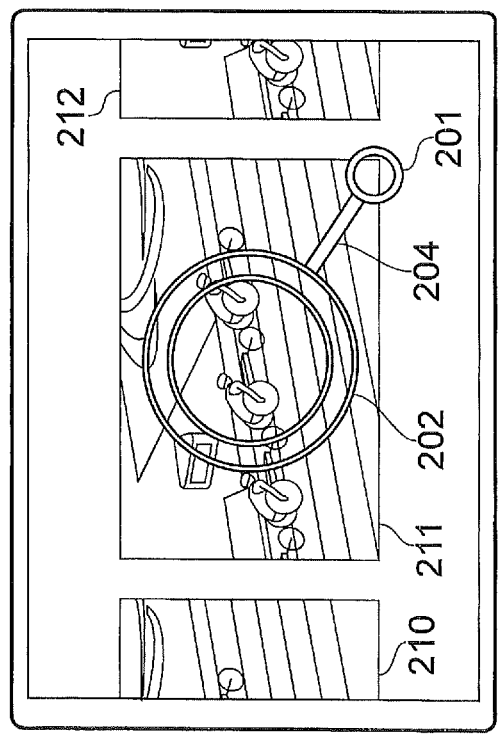

FIGS. 2b and 2c provide illustrative examples of the orbital touch control interface when used to browse files stored on a computer system, such as images on a camera for example. In FIG. 2b the angular direction corresponds to time such as the day or week of creation and the images 210 to 212 are scrolled accordingly, whereby as the orbital touch control is moved in a clockwise direction images may be scrolled through in chronological order. The radial position of the orbital touch control may be used to control the size of the images which are displayed. For example, when the orbital touch control is close to the central ring the images may be displayed at a smaller size compared to when the orbital touch control is positioned further from the central ring. The user is therefore provided with a zoom-type interface in combination with the browsing functionality, resulting in an efficient means for examining a large number of images for example.

FIG. 2c provides an illustration of the interface of FIG. 2b but where the orbital touch control is positioned in the radial direction closer to the central ring. As a result of the positioning of the orbital touch control the displayed images are smaller and therefore an increased number can be displayed simultaneously.

As illustrated in FIGS. 2a to 2c, the orbital touch control may be displayed as being 'tied' or 'tethered' to the reference point via a connecting "string" or "tether" 208 that provides a user with a visual indication of the radial direction. Although in FIG. 2a the tether is depicted as connecting to the central ring 202, the tether may also be displayed as connecting to the reference point 207 and in some embodiments the "string" or "tether" may not be displayed.

The orbital touch control provides a simplified and intuitive multi-parameter controlling interface which requires only a single touch input to operate, unlike the existing control interface of FIG. 1c. The single touch ability of the orbital touch control suits it for operation by a user which is holding a smartphone or tablet computer in one hand and interacting with the device with their second hand, thus providing users with increased functionality compared to existing control interfaces. Furthermore, the orbital touch control also obviates the need for multi-touch input capabilities of a touch screen to simultaneously control two parameters. This in turn may reduce the need for relatively complex and costly multi-touch touch screen displays and reduce the complexity of the associated signal processing and application programming.

Indications of current values of parameters represented by the orbital touch control and allowable ranges of the parameters may be displayed alongside each axis so that a user is provided with numerical feedback as well as visual feedback on the parameter values. The orbital touch control may also be overlaid in an opaque or translucent manner on the subject matter whose parameters are being represented/controlled via the orbital touch control. In the aforementioned example relating to file searching the orbital touch control may for example be overlaid on thumbnails of the files which fall within the search parameters. Similarly, when parameters of an image or video are being adjusted the orbital touch control may be overlaid on the edited image or video such that the real time effects of adjusting the parameters can be observed by the user.

The orthogonal nature of the movement in the radial direction and the angular direction allows a first and a second parameter to be adjusted both separately and jointly depending on the movement of the orbital touch control relative to the reference point. The ability to jointly or separately adjust parameters may be particularly suited for parameters which are interrelated. For example, related parameters such as colour and saturation of an image or video may be particularly suited for control using the orbital touch control. In order to increase the ease with which parameters can be jointly and separately adjusted, in some examples the control interface is configured to allow the user to lock one of the parameters that are to be controlled by the orbital touch control by fixing the position of the orbital touch control with respect to a certain axis. For instance, in response to a user double tapping the string the orbital touch control may be locked and unlocked in the radial direction such that the value of the parameter represented by the radial position is temporally fixed. Likewise, in response to a user double tapping the ring the orbital touch control may be locked and unlocked in the angular direction. In some example control interfaces two or more orbital touch controls may be displayed such that two or more parameters may be adjusted or a range of two or more parameters can be specified. Each of the two or more orbital touch controls may be positioned independently as is described below in more detail.

In further configurations, a single orbital control may be used to control a single parameter, where movement along the first axis scales the adjustment of a parameter via the second axis. For instance, where an orbital touch control is utilised to control time-skipping of a video stream, movement in the angular direction may determine the direction in which the stream is skipped i.e. clockwise movement equates to forward playback and anti-clockwise movement to reverse playback. The radial position of the orbital touch control may then determine the period of time which is skipped via one rotation of the orbital touch control. For example, when the orbital touch control is 1 cm from centre point one orbit of the touch control may represent a skip period of 30 seconds whereas at a distance of 5 cm from the centre point one orbit of the touch control may represent a skipped period of five seconds.

Figure 3A:
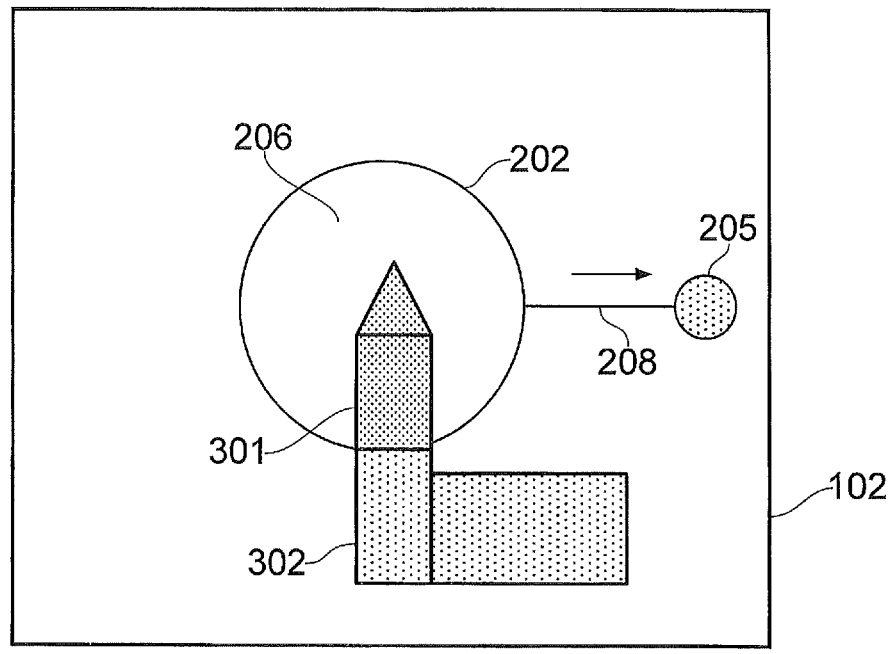
FIGS. 3a to 3b provide illustrations of an example parameter control interface in accordance with the present disclosure.

FIG. 3a provides an illustration of an example implementation of the orbital touch control when applied to the adjustment of image parameters. The touch sensitive screen 102 displays an image over which the orbital touch control and the central ring are overlaid, where the image may be a still image, a frame of a captured video or a video which is currently playing for example. In FIG. 3a the position of the orbital touch control in the radial direction is configured to control the contrast of the underlying image and for simplicity the angular control axis is not considered. A portion of the image 301 is enclosed by the ring 202 and it is this portion of the image which represents a preview of an equivalent portion of the underlying image with the newly adjusted parameter. The portion 302 of the image that lies outside of the ring represents the unaltered image. As the orbital touch control is moved in an outwardly radial direction the contrast is increased as shown in FIG. 3a by the darkened portion 301 of the image. Once a parameter has been adjusted as required, the adjusted parameter may then be applied to the whole of the image via a user interaction such as double tapping the preview portion within the central ring.

Figure 3B:
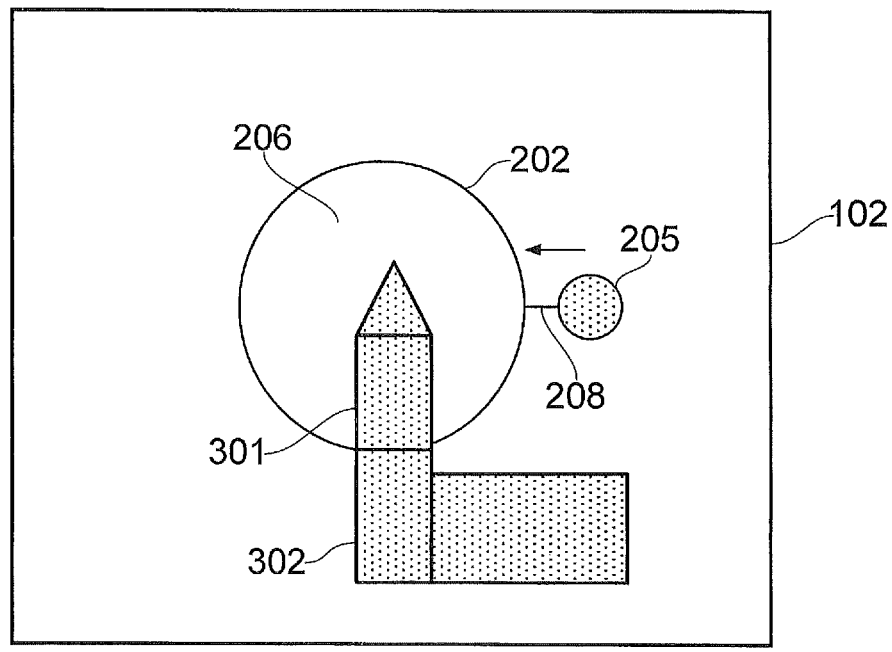

FIG. 3b provides an illustration of an example implementation of the orbital touch control when it is moved in an inwardly radial direction. As the orbital touch control is moved inwards along the radial axis the contrast of the image is reduced, with a preview of the reduced contrast image being displayed within the aperture of the central ring 202.

In both FIGS. 3a and 3b the central ring and orbital touch control may be placed in any location with respect to the image so that the user may view a preview of the image with the updated parameter(s) at that position. The ring and orbital touch control may for example be configured to be jointly movable with respect to the display if a user continuously touches the centre of the central ring for a predetermined period of time. The ring itself may also be able to vary in size by dragging the circumference of the ring, such that an increased size preview portion may be obtained.

Providing a preview of a portion of the adjusted image within central the ring performs a number of functions. Firstly, it allows a user to compare directly side-by-side portions of the image which have and have not been adjusted. Secondly, because only a single instance of the image is displayed as opposed to two images as shown in FIG. 1, the single image may be displayed at an increased size, thus providing the user with increased image detail without having to zoom in on certain aspects of the image. Such a parameter adjustment user interface may be particularly suited to portable touch screen devices where it is often important to maximise screen utilisation in order to limit device size. Although FIGS. 3a and 3b have used image contrast as an example parameter, any parameter may be adjusted using the orbital touch control. Alternatively or in addition to providing a preview within the ring, there may be a separate user control such as button of touch gesture which allows the entirety of the displayed image to be displayed with the updated parameter(s). Also, in some examples the portion of the image 302 may form the preview and the portion of the image 301 represents the unaltered image.

As previously mentioned, the orbital touch control may be used to represent and adjust parameters associated with data such as image data. With regards to images, their associated parameters may be adjusted in one of two ways. Firstly, the image parameters may be adjusted once the image has been captured, for instance the adjustment of contrast, colour, saturation etc. are easily adjustable using post production techniques. Secondly, the parameters associated with images may be adjusted by controlling the parameters of the image capturing apparatus themselves. For instance, aperture, shutter speed, focus etc. are each more readily adjustable by controlling the image capturing apparatus itself. In order to control an image capturing apparatus using the orbital touch control, the orbital touch control may be displayed on an interface of the image capturing apparatus or may be present on a computing device such as a tablet or smartphone which is remotely connected to the image capturing apparatus. Both of these possibilities are discussed in more detail below. Regardless of the method of adjustment, control signals providing an indication of the adjusted parameter values may be generated by the processor module and then transmitted to the appropriate location such as. the processor module in the computing device, processing server or image capturing apparatus for performance of the parameter adjustment.

The form of preview described above with respect to FIGS. 3a and 3b is most likely to be applicable when the parameter of interest may be adjusted via post-processing of the selected image. For example, contrast, saturation, colour filters may be applied in post-processing and therefore it is possible to apply the adjusted parameter to only a portion of the image. In contrast, such a preview may not be possible if the user wishes to adjust a parameter which may only be adjusted at the image capturing apparatus, such as focus, aperture etc. because to apply the adjusted parameters a new image will be required to be captured and therefore the parameter will be applied to the entirety of the newly capture image. However, this lack of preview ability may be overcome by displaying an image captured pre-parameter adjustment as the underlying image and a portion of image capture with the adjusted parameters within the central ring.

In some examples, the orbital touch control may be used for controlling parameters which have been traditionally controlled using analogous movements, thus providing a more intuitive touch interface. For instance in image capturing apparatus such as still cameras or video cameras, focus may be adjusted by rotation of a lens barrel and zoom by pivoting a button or vice versa. The movements required to interact with orbital touch control are similar to these movements and are therefore suited to providing an intuitive touch interface which only requires a single finger to operate. It is also increasingly common for digital cameras to be equipped with touch screen interfaces, on which the orbital touch control may be displayed, thus presenting an attractive alternative to conventional mechanical controls. For instance, to adjust the zoom level the orbital touch control may be moved in a radial direction whereas for focussing the orbital touch control may be moved in an angular direction.

Figure 4A:
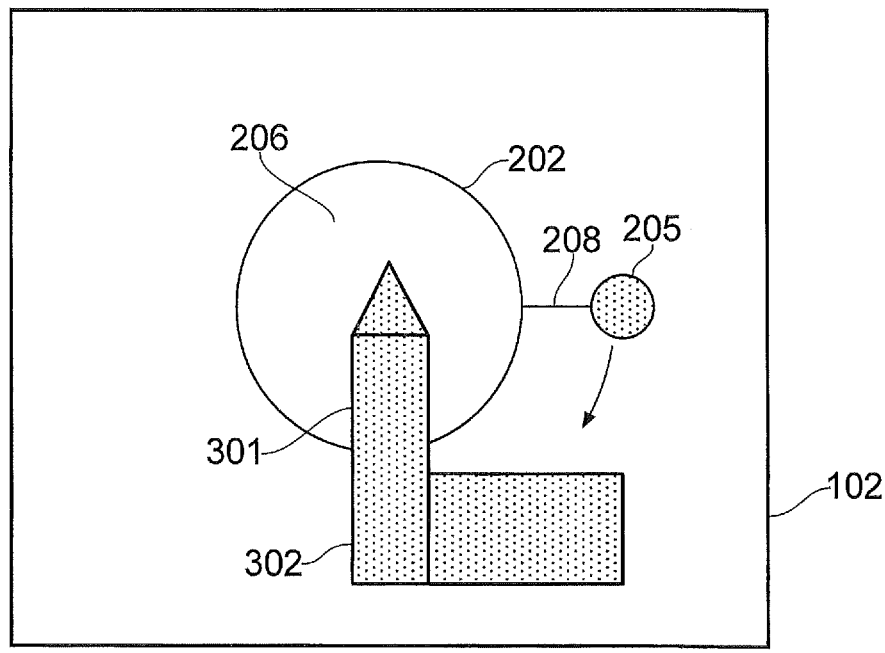
FIGS. 4a to 4d provide illustrations of an example parameter control interface in accordance with the present disclosure.
Figure 4B:
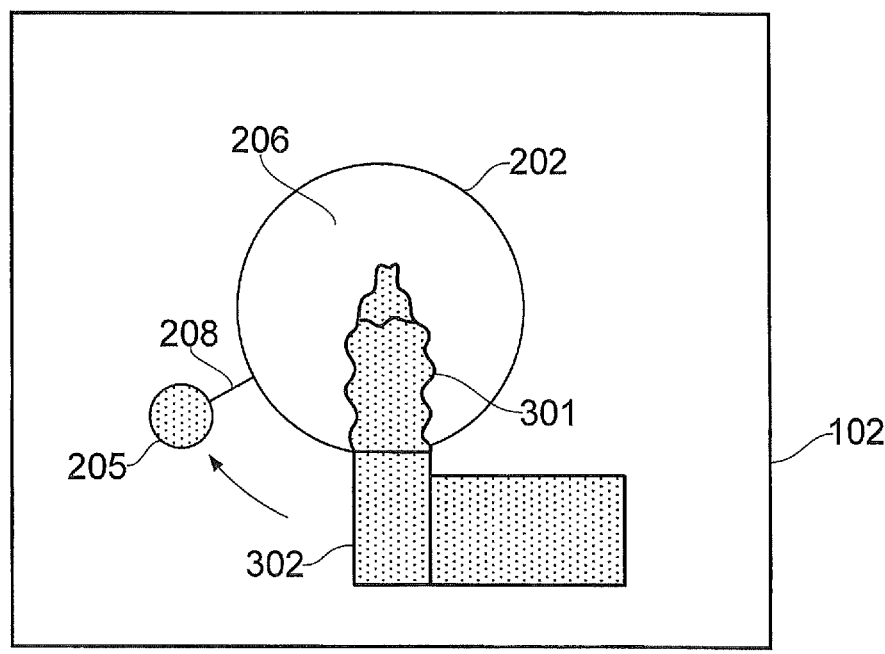
Figure 4C:
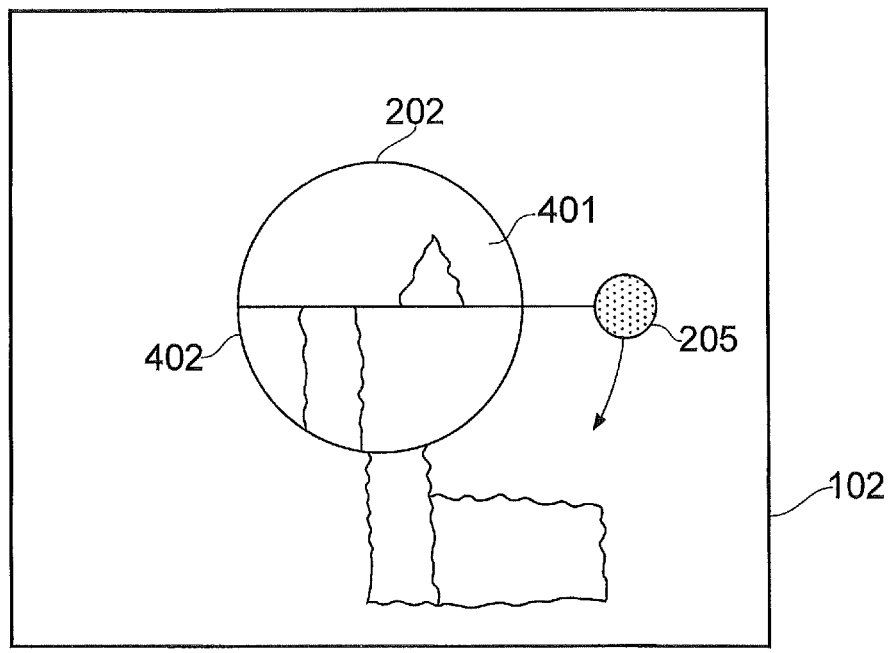
Figure 4D:
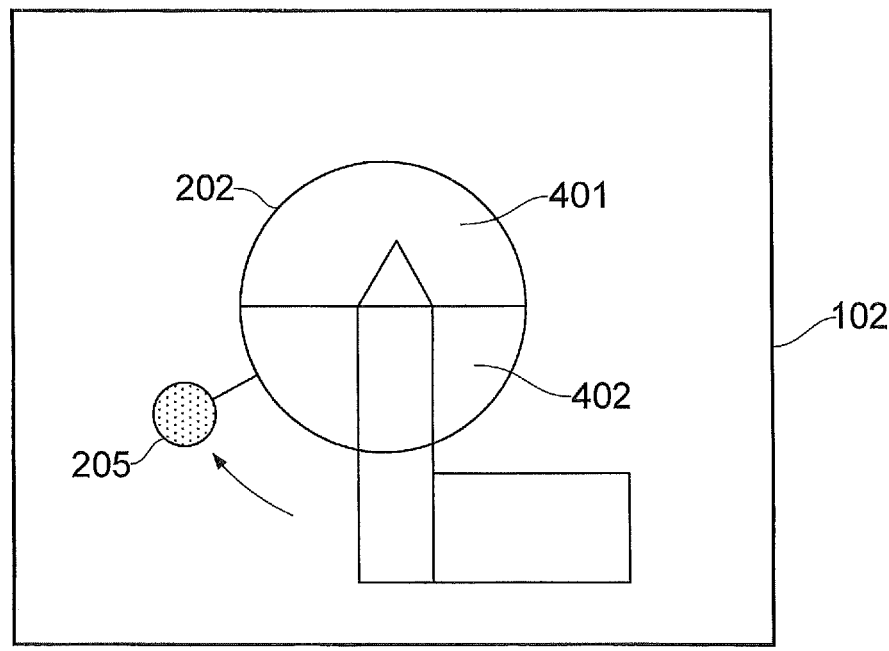

FIGS. 4a and 4b provide an illustration of an example of the orbital touch control where movement in the angular direction is used to adjust an image capturing apparatus parameter such as focus in real-time. In FIG. 4a the whole building 301 302 is in focus but as the orbital touch control is moved in a clockwise direction the portion of the building 302 begins to become out of focus. As previously described, such a preview effect may be achieved by displaying in real-time a portion of the image with the updated parameters in the central ring and displaying a previously captured image as the underlying image or vice versa. Such an approach may be appropriate which the image capturing apparatus is focussed upon a stationary objection but may not be suitable when the object(s) of the captured images is mobile because the underlying image and the portion of the image within the central ring may not correspond. In some examples the orbital touch control in combination with adaptation of the captured images by the processor module may be used to mimic split ring focussing that exists in single lends reflex cameras. However, in devices which are unable to provide two independently focussed images or portion of images, a real-time image and a previously capture image be required to be used to provide the appropriate effect. FIGS. 4c and 4d provide an illustration of the split ring focussing effect that may be achieved with the use of the orbital touch control. In FIG. 4c the portions of the image in the upper 401 and the lower 402 sections of the ring are misaligned, signifying that the image is not currently in focus. However, as the orbital touch control is rotated clockwise the portions of the image in the upper and lower sections of the ring align signifying that the image is in focus. As previously mentioned, in addition to using the orbital touch control to control a device upon which the control is displayed, it may also be used to remotely control the parameters of a device such as video camera. Implementations such as this are described in more detail below.

Whilst adjusting parameters using the orbital touch control, numerical indications of the adjusted parameter values may also be displayed. For example, a numerical indication of the parameter controlled by the angular position of the orbital touch control may be displayed in the central ring or around the circumference of the central ring, and a numerical indication of the parameter controlled by the radial position of the orbital touch control may be displayed within the orbital touch control or alongside the string. Alternatively in or in addition to a numerical indication of the current value of the parameters, a scale may be displayed along the string and or the circumference of the central ring thus providing the user with an indication of the relative magnitude of the movement required to adjust the parameters.

Figure 5A:
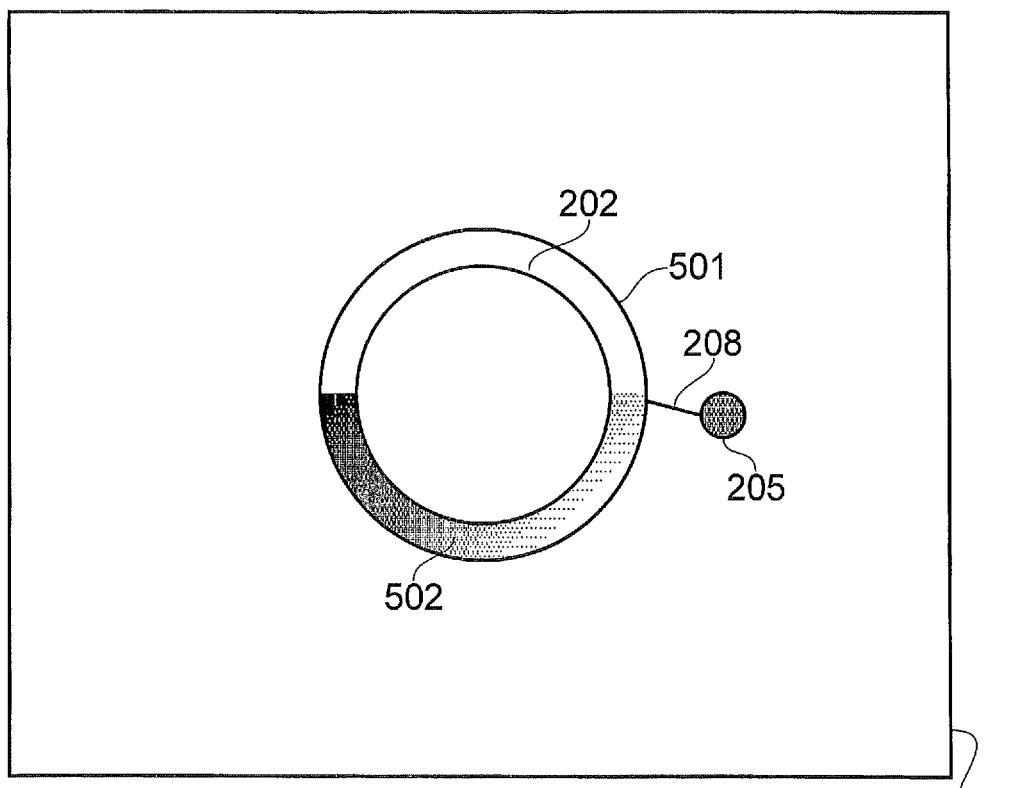

FIG. 5a shows an example where the central ring is formed from two con-centric rings 202 and 501 where the region 502 between the rings is configured to display a scale either numerically or using another visual representation. For instance, if the angular direction is used to control a colour filter to be applied to an image the colours available for selection may be display around the region 502. Likewise, in examples where the angular position is used control the contrast of an image, the ring may display a range of contrast around the ring. An example of the region 502 when the angular position is used to represent and control contrast is shown in FIG. 5a where clockwise movement of the orbital touch control will correspond to an increase in the contrast parameter.

Figure 5B:
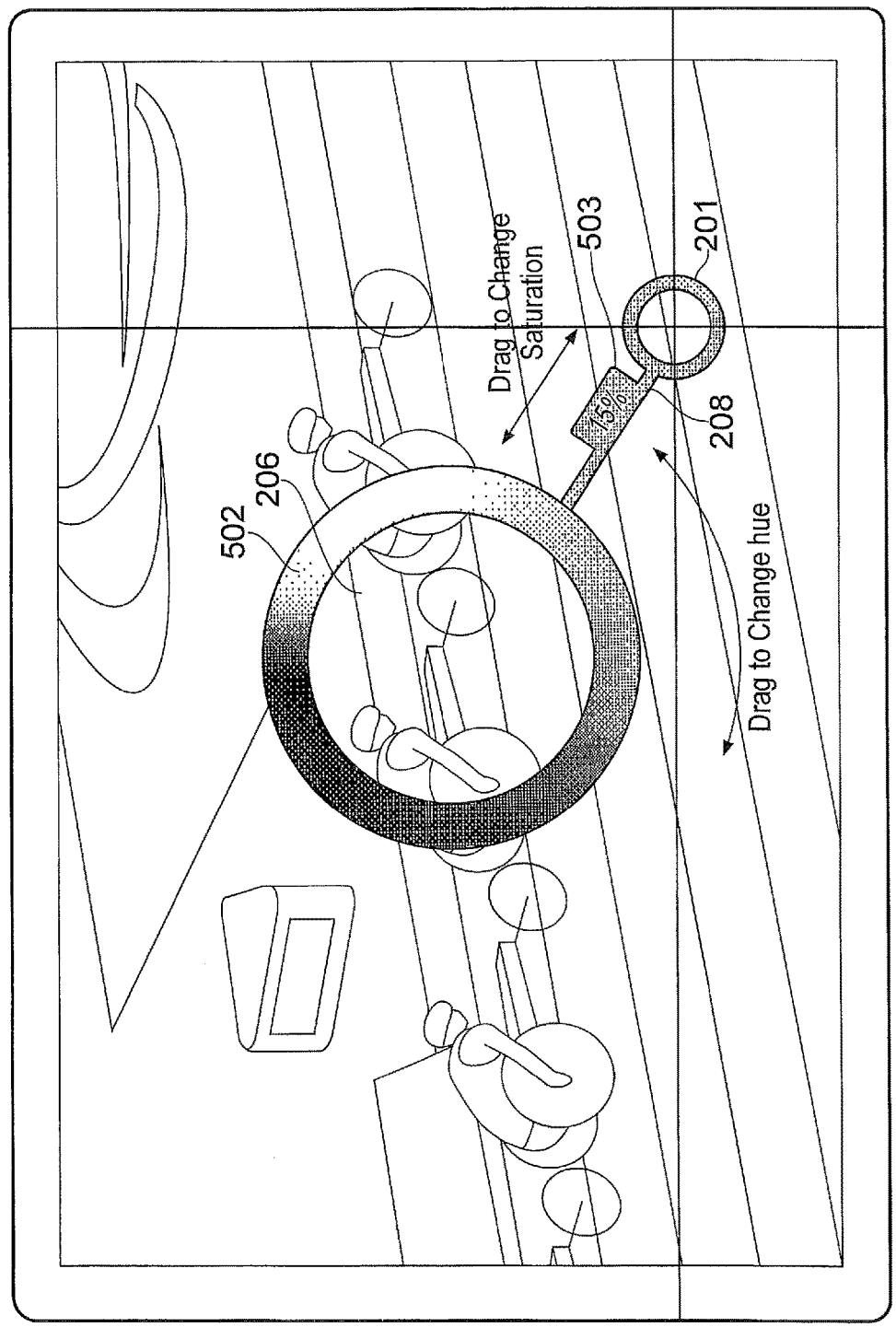

FIG. 5b provides a further example of parameter adjustment or control using the orbital touch control, where the parameters being adjusted may be associated with parameters of a camera or a previously captured image. In FIG. 5b the angular position of the orbital touch control 201 controls the hue of the image, where the different hue levels are indicated between the con-centric rings in the region 502, and the radial position controls the saturation of the images, where the saturation levels are indicated numerically 503 alongside the tether 208. The region 206 within the central ring may once again be used to display a preview or live preview of the effects of altering the parameters.

Figure 5C:
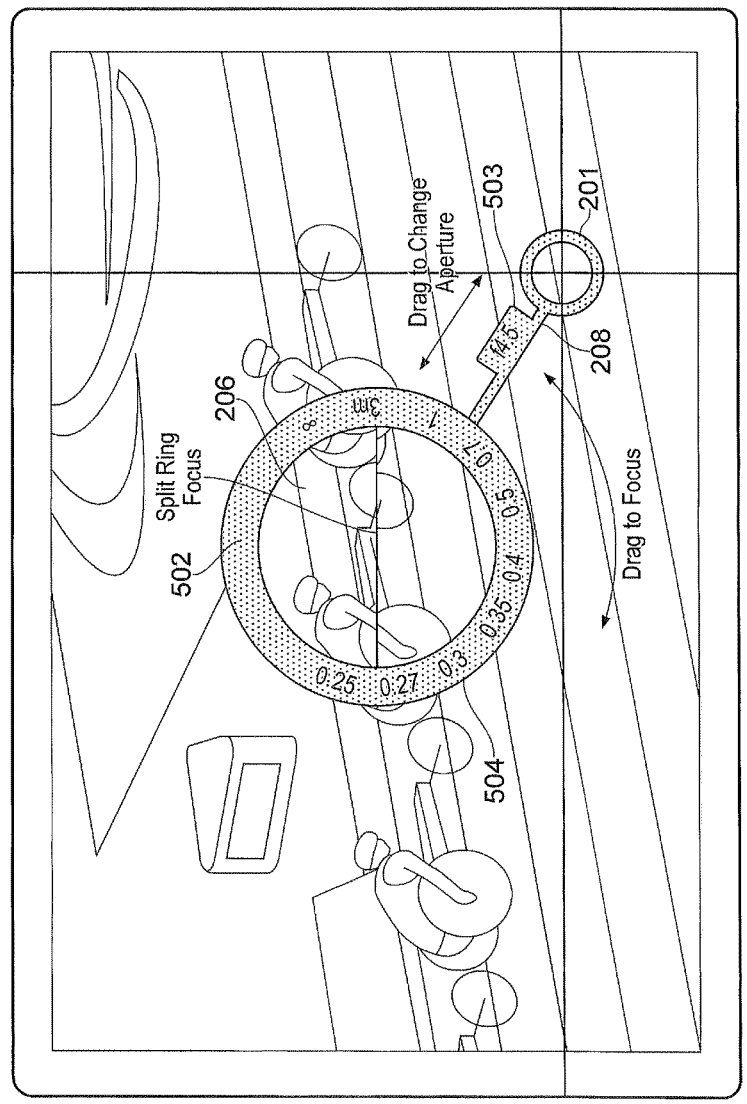

FIG. 5c provides another example of parameter adjustment or control for images or cameras where the angular and radial directions are used to control the focal point and aperture of a camera, respectively, and numerical indications of the parameters are given for both the radial 503 and angular directions 504. In this example the region 206 within the central ring has also been used to provide a split ring focus effect which is often found in analogue single lens reflex cameras, as described above.

In some examples, as well as varying the preview size, varying the size of the central ring may be used to control a third parameter in addition to the two controlled by the orbital touch control. In such an example the central ring may be adjusted by a user dragging the central ring either inwards or outwards to adjust its size and the processor module then generating control signals which indicate to the appropriate element the required parameter adjustment. The ability to control three parameter via the orbital touch control and the central ring may be particularly beneficial for the control of image capturing apparatus parameters where parameters such as aperture, focal length and shutter speed are common adjusted together in order to obtain the desired exposure. For example, the size of the central ring, the angular position of the orbital touch control and the radial position of the orbital touch control may control the aperture, focal length and shutter speed of a camera, respectively. FIGS. 5d and 5e provide illustrative examples of the orbital touch control where three or more parameters may be controlled. In FIG. 5d as well as the angular position 510 and the radial position 511 of the orbital touch control, one or more of the diameter of the central ring 513 and the diameter of the orbital touch control itself 512 may be adjusted, thus providing for one or more further parameter adjustment possibilities. These adjustments may once against be effected by the user positioning their finger or input device over the relevant ring and dragging the ring outwards or inwards.

In FIG. 5e as well as the angular position 510 and the radial position 511 of the orbital touch control, an additional slide 514 is positioned along the tether and may be adjusted in the radial direction towards and away from the central point of the central ring in order to control a third parameter.

Constrained Parameter Adjustment

Figure 6A:
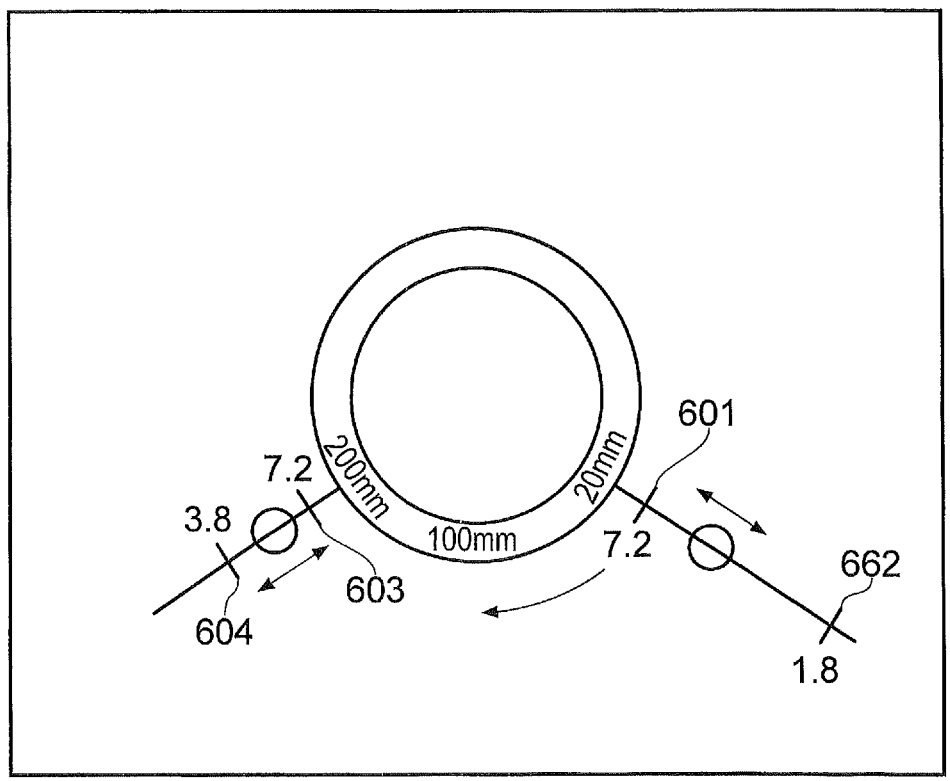
FIGS. 6a to 6d provide illustrations of an example parameter control interface in accordance with the present disclosure.

In some examples, the orbital touch control of the present disclosure may be used to provide an interface to control interrelated parameters in a more intuitive manner compared to existing control interfaces. For instance, in photography the range of apertures available for selection may be constrained by the current focal length. In scenarios such as this an indication of an allowed range of a first parameter may be given for a current value of a second parameter. In FIG. 6a the angular position of the orbital touch control is configured to represent the focal length of an image capturing device and the radial position is configured to represent the aperture of the image capturing device. At a first focal length of 20 mm the aperture may be adjusted between 7.2 and 1.8 where this range is indicated by the markers 601 and 602. However, at a second focal length of 200 mm the range of available apertures is more limited as indicated by markers 603 and 604. Conversely, although not illustrated in FIG. 6a, adjustment of the second parameter may constrain the available range of the first parameter available and therefore markers may also be displayed on the circumference of the rings 202 and 502 or the internal region 502. The orbital touch control therefore allows intuitive single touch control of two interrelated parameters where information of the available values of the parameters is clear and simply provided to the user. As well as displaying allowable ranges marking representing allowable intermediate values may also be displayed. Returning to the aperture control example, only certain values i.e. f-stops may be available and therefore the orbital touch control may "snap" to the values represented by the markers as it is moved via user interaction with touch screen display on which the orbital touch control is displayed.

As described above, the orbital touch control may be used to control parameters associated with images, either by adjusting the properties of the image themselves or via adjusting properties of the devices which capture the images. However the orbital touch controlled is also suited for use with any parameter adjustment process, for example it may be used to control the transition of image parameters with respect time or for the splicing of video streams together.

Figure 6C:
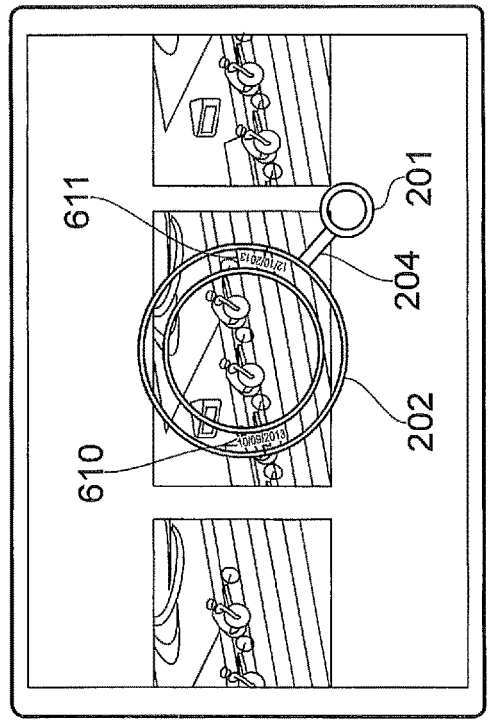
Figure 6B:
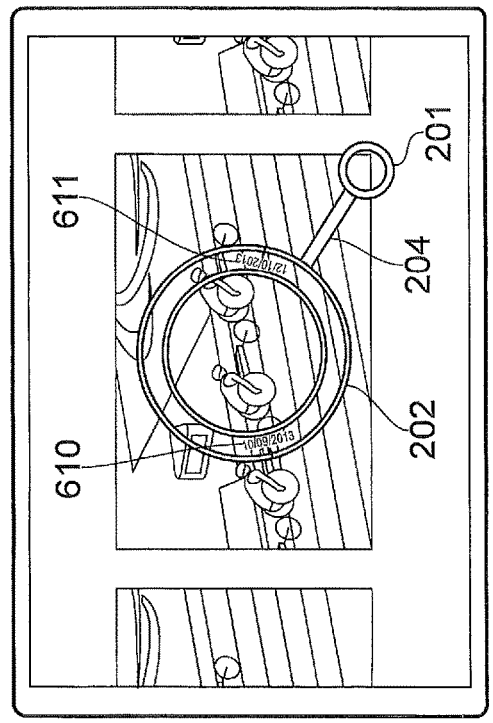
Figure 6D:
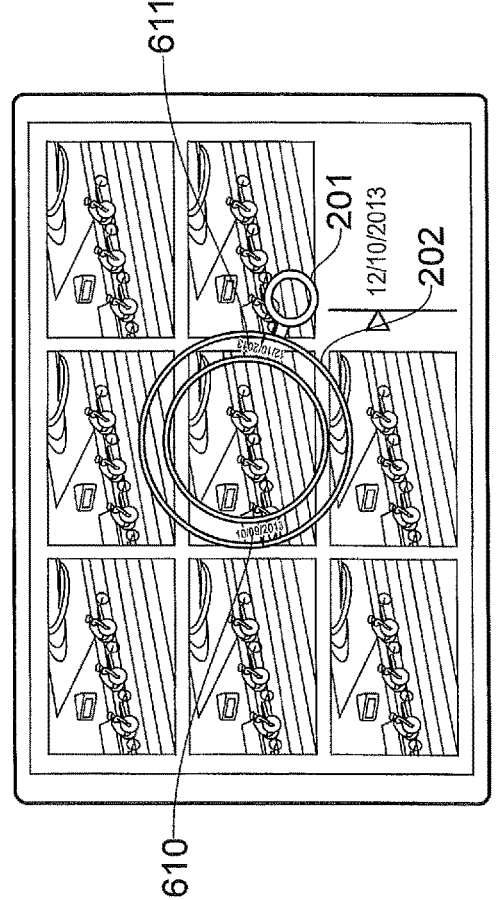

FIGS. 6b to 6d provide illustrative examples where constrained parameter adjustment using the orbital touch control is used for browsing files such as image files or frames of videos. As in FIGS. 2b and 2c the angular direction may control a time parameters such as the date or time the images were captured or files were created and the radial direction may control the size the images will be displayed in the user interface. However, there are also constraints on the dates that may be chosen by the angular movement of the orbital touch control. These dates 610 611 are shown within the two con-centric rings associated with orbital touch control and may for example be adjusted by double tapping them and then numerically entering new dates. The use of these bounding dates may assist with improving the accuracy of scrolling using the orbital touch control because a similar angular movement will caused a small change in parameter if the bounds include a smaller range of dates compared to if the bounds include a large range of dates. FIGS. 6b to 6d illustrates the transition that occurs as the orbital touch control is moved in an inwardly radial direction, where the displayed images decrease in size as the as orbital touch control is moved inwardly, as described with reference to FIGS. 2b and 2c.

Parameter Range Control

Figure 7A:
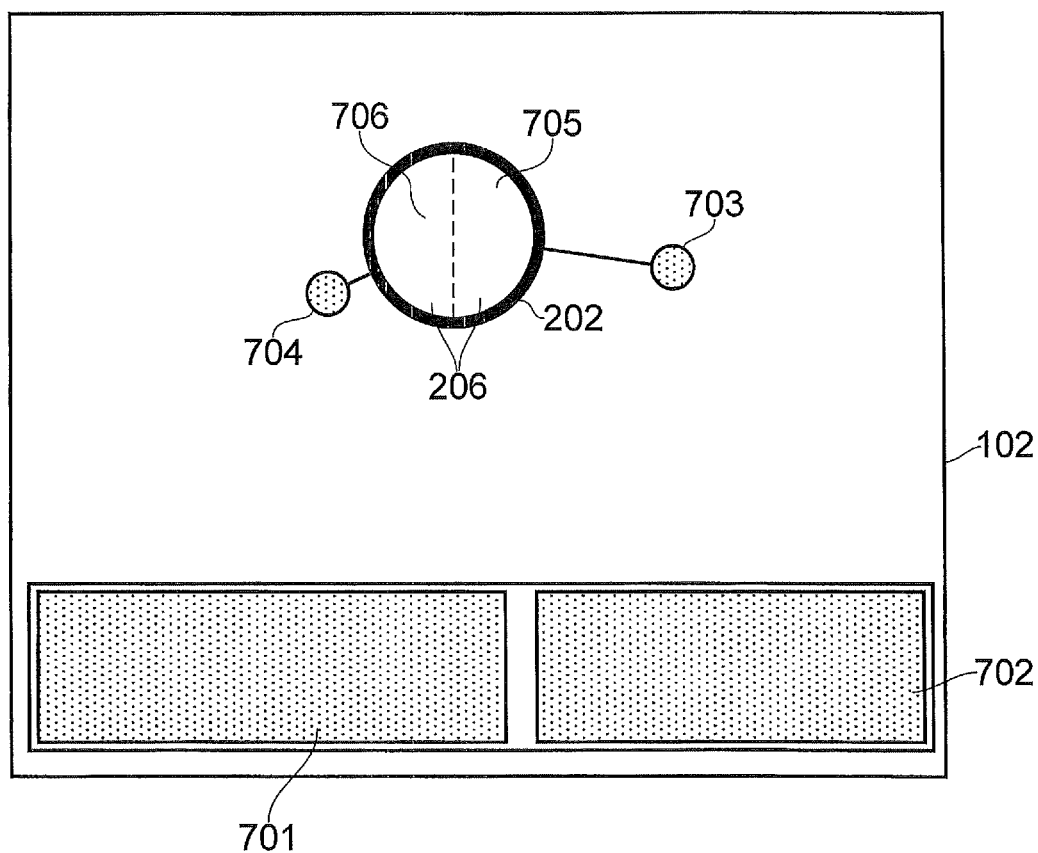
FIGS. 7a to 7c provide illustrations of an example parameter control interface in accordance with the present disclosure.

FIG. 7a provides an illustration of an example graphical user interface for video editing when the orbital touch control is utilised in the splicing of videos together. Displayed on the screen 101 are two video streams 701 and 702 that have been selected by the user and which the user intends to splice together. The control interface includes two orbital touch controls 703 and 704 which may correspond to the initial and final parameter values of one or both of the videos streams and are independently movable. For example, the orbital touch control 703 may represent the initial colour and saturation of the video stream 701 and over a predetermined period of time set by the user, the colour and saturation of the video stream 701 transitions to those values represented by orbital touch control 704. This transition may for example be configured such that the second video stream begins to play as the parameter transition from 703 to 704 completes. Alternatively, the two video streams may overlap for the predetermined period of time and the parameter changes are performed in reverse on the second video stream such that there is a seamless fading splice between the video streams. In yet another alternative example, two central rings each with two orbital touch controls may be provided where the orbital touch controls of each central ring are configured to control the parameters of each video stream. In yet further examples the region 206 enclosed by the central ring 202 may be divided into two or more portions where a first portion 705 displays the underlying portion of image subject to the initial parameters and the second portion 706 displays the underlying portion of the image subject to the final parameters.

Figure 7B:
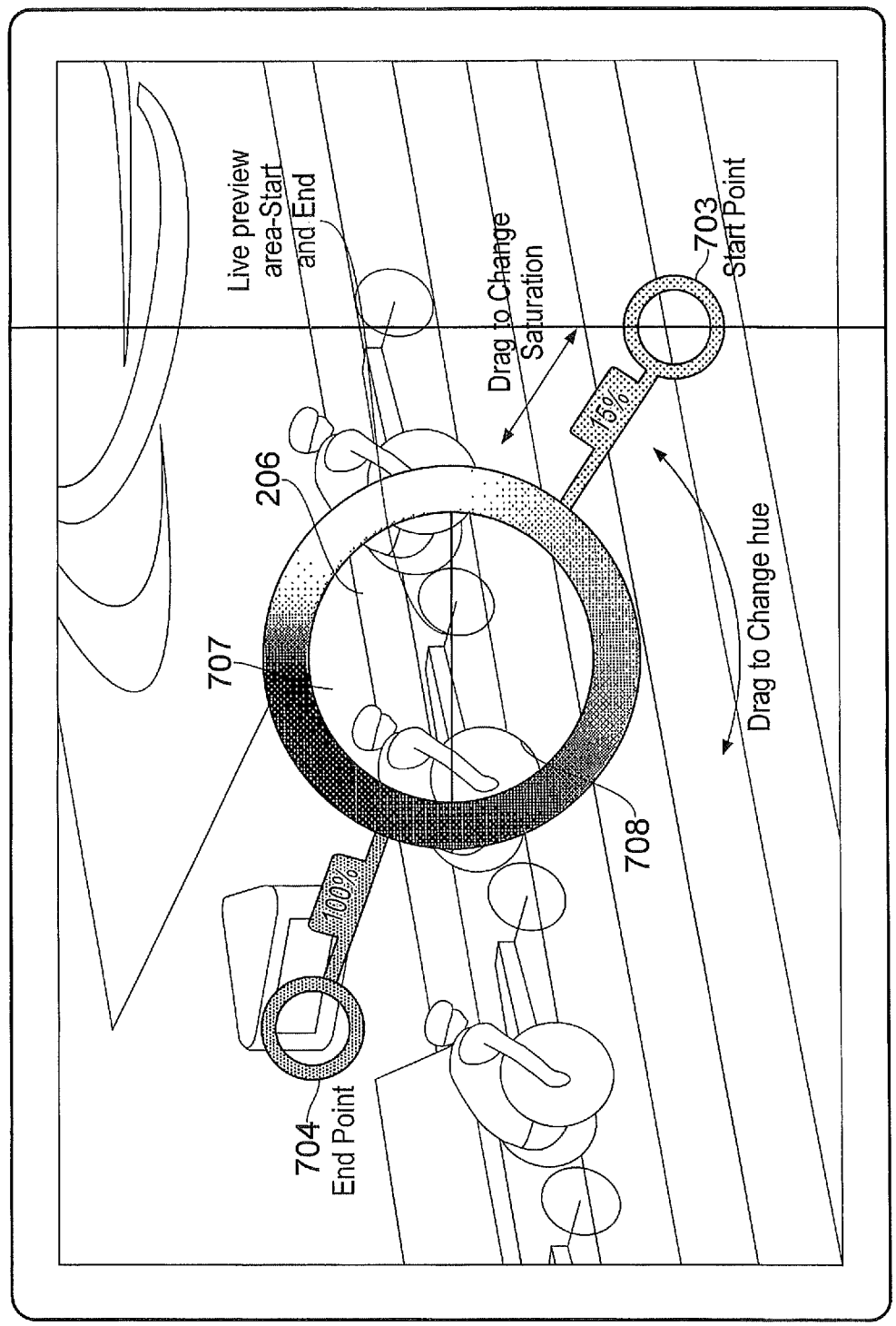

FIG. 7b provides a more detailed illustration of the appearance of a user interface where two orbital touch controls are utilised to control the transition of two parameters from starting values to end values. In FIG. 7b the angular position represents the hue of the captured images and the radial direction represents the saturation of the captured images. Orbital touch control 703 represents the starting point and thus starting values for the parameter adjustment or transition and orbital touch control 704 represents the end point and thus the end value of the parameters. The two orbital touch controls can be positioned to control the parameter transition in any desired manner as previously described. The area 206 within the central ring may be used to provide a live preview of images to which the starting and finishing parameters have been applied, where in FIG. 7 the upper portion 707 within the central ring presents an image with the starting parameters applied, and the lower portion 708 within the central ring provides an image with the end parameters applied. The parameters for adjustment may relate to image capturing apparatus parameters or to an image, image stream or two streams which have been previously captured or are currently being captured and may be spliced together during the parameter transition period.

Figure 7C:
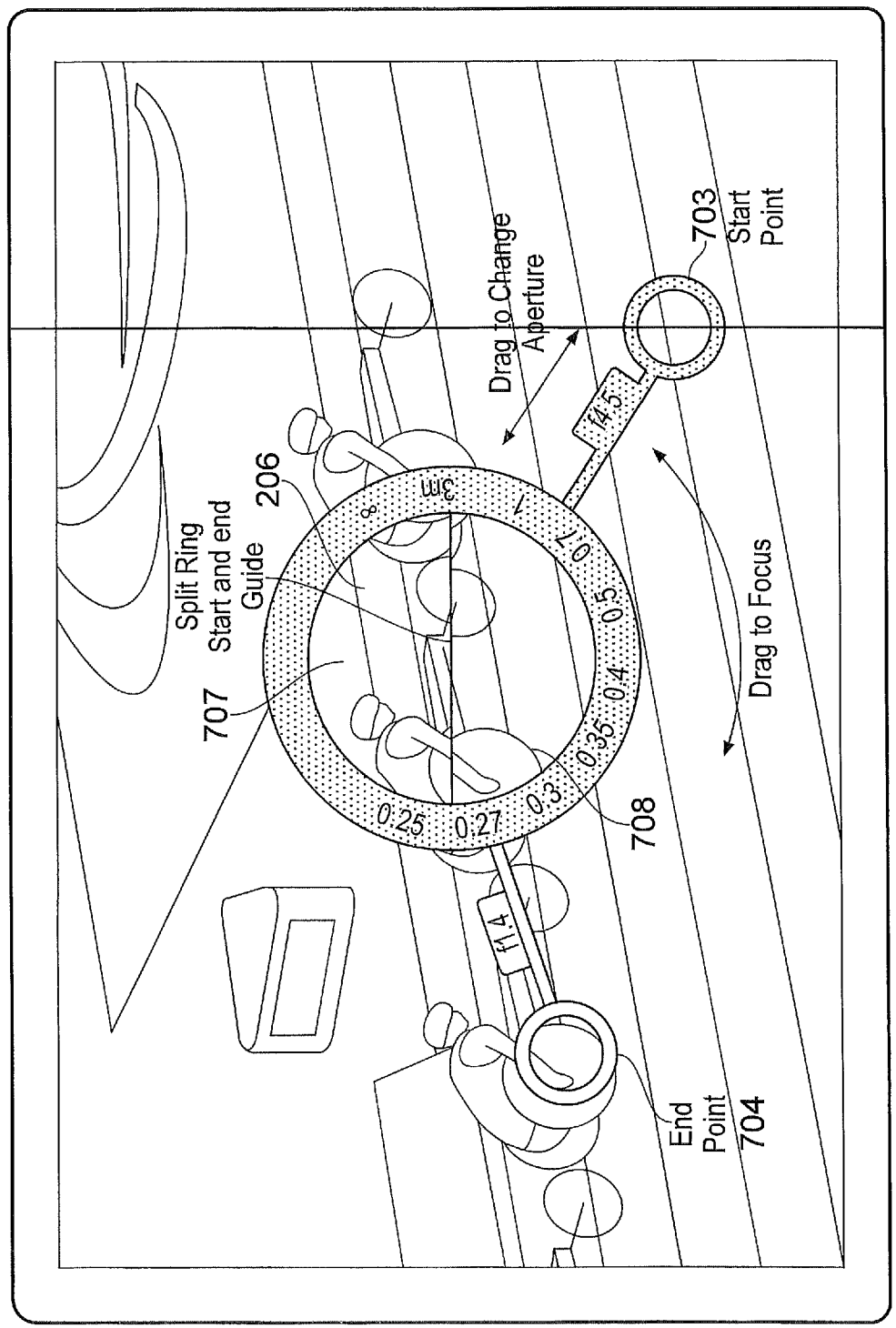

FIG. 7c provides a further illustration of dual parameter control transitions where the parameters being controlled are the focus and aperture of a camera or camera(s). The parameters begin at f4.5 and a focus of approximately 0.9 m and over a predetermined transition period, the parameters transition to f1.4 and a focus of 0.27 m. The area 206 within the central ring may once again be divided into two portions 707 708 where one of the portions provides an image(s) to which the starting parameters have been applied and the remaining portion provides an image(s) to which the end point parameters have been applied.

Real-Time Video Editing

The simplicity, intuitiveness and speed of parameter adjustment using the orbital touch control may find application in real-time or near real-time video editing software suitable for execution on touch screen devices for example. In particular, it is envisaged that orbital touch control(s) may be incorporated into a video editing suite configured for real-time editing of video streams obtained from multiple cameras in order to form a single video stream that may be distributed to viewers. However, editing of pre-recorded video streams in non real-time may also be performed using such software.

Figure 8:
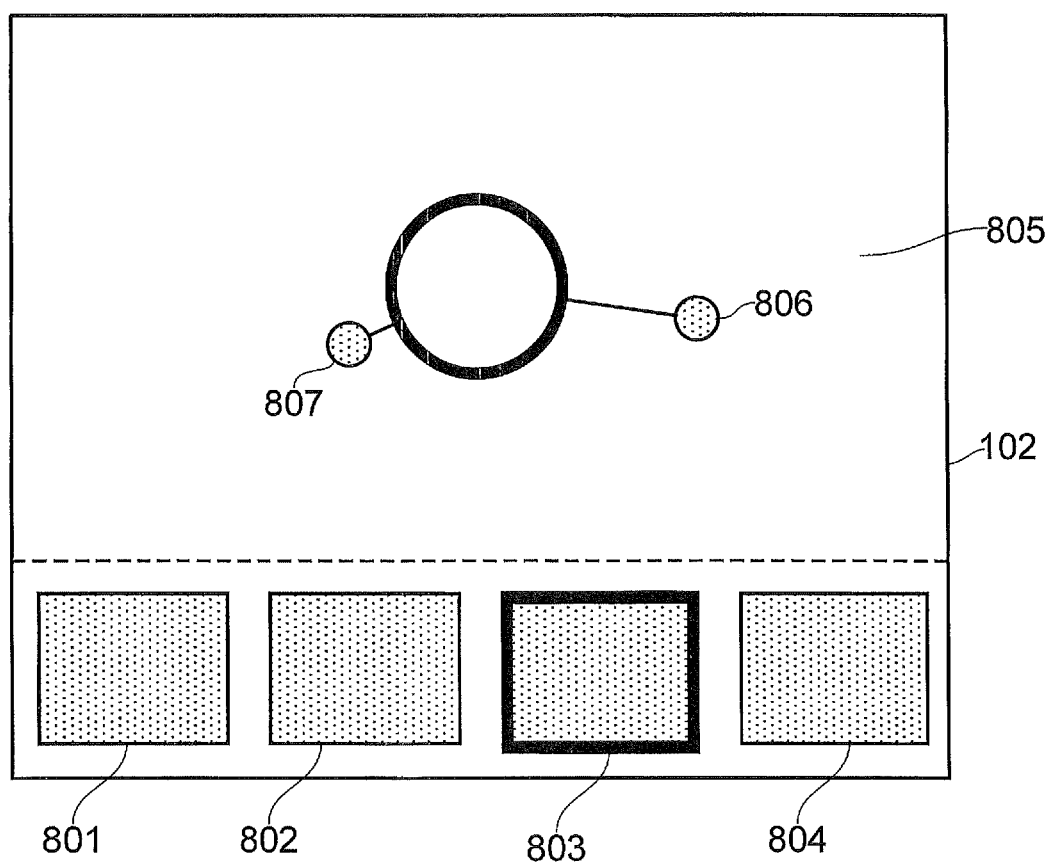
FIG. 8 provides an illustration of an example parameter control interface in accordance with the present disclosure.

FIG. 8 provides an illustration of an example user interface that may be used to perform real-time editing of video streams on a touch screen device. The touch screen 101 provides an interface comprising one or more windows 801 to 804 which each display an available 'clean' unedited video stream that is being captured by one or more remote image capturing apparatus. A main portion of the display 805 displays the edited video stream which is currently being recorded and or provided to viewers, and the orbital touch controls 806 807 provide an interface for controlling parameters of one or more of the video streams such that video streams can be spliced together and their parameters adjusted to achieve smooth transitions between video streams. The currently selected unedited video stream is highlighted as shown by window 803. Although a particular arrangement of video windows and orbital touch controls has been illustrated in FIG. 8, orbital touch controls may be used to control parameters associated with the videos for a range of interface configurations. For example, numerous alternative arrangements are also possible such as providing a main portion of the display that is divided into two portions, where a first portion displays the highlighted video stream prior to editing and a second portion displays the edited video stream that is being recorded or distributed to viewers.

An interface including one or more orbital touch control such as that illustrated in FIG. 8 provides an intuitive but highly functional video editing interface suitable for use by consumers and "prosumers" who wish to provide real-time or near real-time edited video to selected viewers. For example, an organiser of a conference may wish to provide a live stream of a keynote speech to viewers around the world via the Internet. This may be done by providing one or more video streams to a touch screen device executing software that provides an orbital touch control based interface as shown in FIG. 8. A user may then edit the provided streams by controlling parameters and splicing video streams together using the orbital touch control(s) to form a video stream which is to be distributed to the interested persons. For example, a pair of orbital touch controls may be displayed for each video stream thus allowing visual parameters and temporal parameters to be easily adjusted. In particular the use of the orbital touch controls provide a fast and efficient interface by which multiple parameters can be controlled with a single touch input. This is in contrast to existing interfaces which require multiple touch inputs and switching of interfaces to control multiple parameters simultaneously, thus making them unsuitable for real-time video editing applications where the there is limited time to perform the editing.

Figure 9:
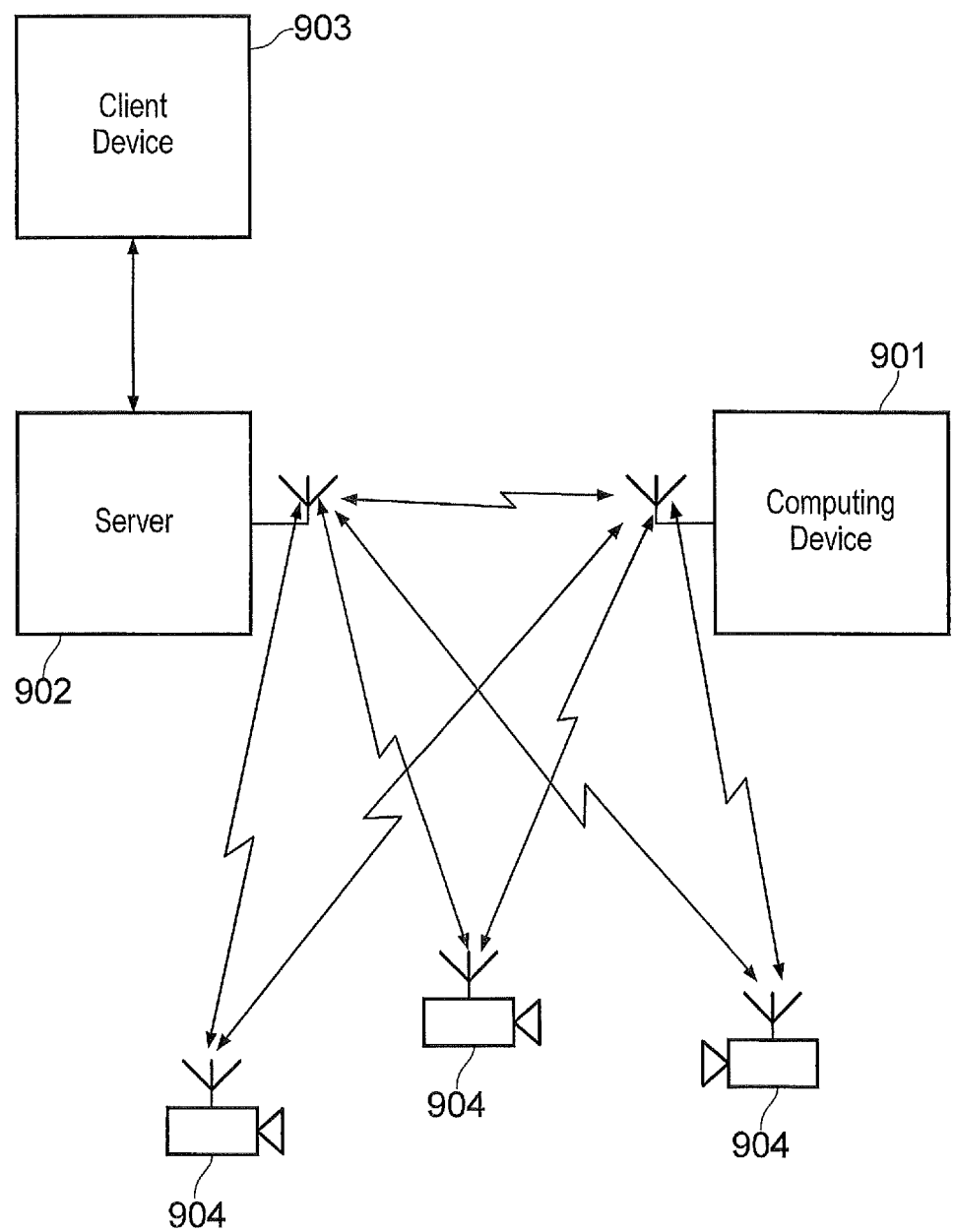
FIG. 9 provides an illustration of an example video editing system in accordance with the present disclosure.

FIG. 9 provides a diagram of an example video capturing system in which the editing tools and or parameter adjustment techniques described above may be used. The system comprises a touch screen computing device 901 such as tablet computer or a smartphone, a sever 902, one or more client devices 903 on which video may be view or stored, and one or more image capturing apparatus 904 such as video cameras that are configured to provide signals representing the images within their field of view. The computing device 901 is configured to read and execute computer executable instructions that may be stored internally in memory, provided on a computer programmable medium operable to store the instructions or provided via a network connection. When executed the instructions configure the computing device to provide on a touch screen a graphical user interface comprising at least an orbital touch control and associated controls, examples of which have been described above. A user of the computing device controls the video editing via at least the orbital touch control to form an edited video stream which is then provided to the one or more client devices by the server, where client devices may be provided for example with a URL in order to access the edited video stream. The computing device 901 is communicatively linked to the server and video capturing apparatus via a wired or wireless communications network such as a local or wide area network for example, and the server is communicatively linked to the client device(s), computing device and video capturing apparatus via a wired or wireless communications network such as a local or wide area network. The video cameras 904 are configured to capture images and to transmit video signals representing the captured images to server and or the computing device. Once received at the server the video signals representing the captured images may be stored in a memory and provided to the computing device if the video cameras have not directly transmitted the signals to the computing device. Once the signals from the video cameras are received at the computing device an edited video stream may be formed by a user interacting with a user interface as described above. The data processing required to perform the parameter adjustment and video editing may be performed at the computing device or performed by the server in a distributed manner. For example, the computing device may transmit control signals that provide indication of the parameter adjustments and desired video editing to the server and then the processing of the video streams is performed at the server. Utilising a distributed approach to the video editing transfers the computational burden of the data processing from the computing device to the server, which is likely to have increased processing power and also reduced power consumption constraints. A second advantage of performing the data processing at the server is that bandwidth savings may be achieved by relaying reduced quality or proxy video streams to the computing device whilst the full quality video streams are utilised at the server to form the edited video stream. The proxy video streams may be provided directly from the video cameras such that the video cameras relay reduced quality video streams to the computing device and a full quality video stream to the server for storage and processing. In some examples the images capturing apparatus may be a 4K image capturing device which provide a 4K video stream to the sever but only an 1080p high-definition proxy video stream to the computing device. Alternatively, the video cameras may transmit full quality video to the server which then provides the proxy feeds to the computing device. In other examples, in order to reduce memory requirements at the server and bandwidth requirements of the system, the video cameras may be configured only to transmit full quality video signals to the sever when it is their video stream which is currently forming the edited video. However, in such an example the video camera may still be required to transmit reduced quality video streams to the computing device either directly or via the server so that the user is provided with an indication of the content of each video stream in real-time.

Although described as real-time video editing it may be beneficial if a small delay is introduced into the video editing so that the controlling user is provided with information on the content of the video streams prior to editing. For instance, the edited video stream may be delayed by approximately 20 seconds so that the user has 20 seconds to decide on the editing of a video stream using the orbital touch control(s) prior to providing the edited stream to the viewers. Alternatively, in order to avoid introducing a delay the parameter adjustments and splicing of the video streams using the orbital touch controls may be predefined prior to editing. For example, it may be specified that at 2 minutes 30 second the colour saturation of video stream one is reduced from a maximum to a minimum value over a period of 30 seconds and the during the 30 second period video stream two is overlaid on top of video stream one and its saturation is increased from a the minimum to the maximum.

Figure 10:
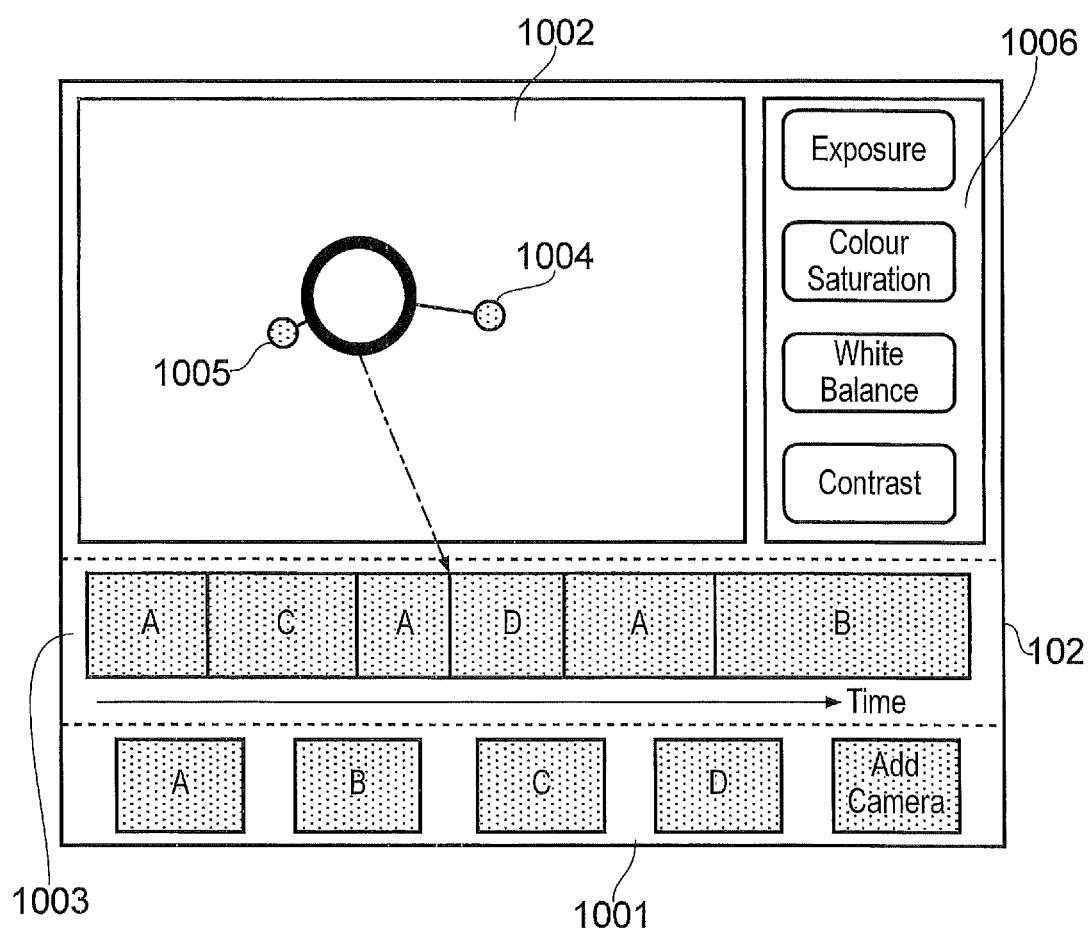
FIG. 10 provides an illustration of an example parameter control interface in accordance with the present disclosure.

FIG. 10 provides an example touch screen interface that utilises orbital touch controls to enable efficient editing of video streams. The interface includes windows in area 1001 displaying the video steams A to D currently being provided by video camera A to D and any further video streams that may be added via the "Add Camera Button". The interface also includes a main area 1002 which displays the video stream currently being edited in a manner similar to FIG. 8. However the interface also includes a video stream queue 1003 which displays the video streams which are queued to form the edited video stream. In the video stream queue the videos streams have been queued with respect to time, where video streams may be introduced into the queue by dragging and dropping the video streams from the area 1001 into area 1003. Once video streams have been queued, parameters of the video streams may be adjusted via the use of orbital touch controls 4001 and 1005. For example, a user may select queued video stream "A" as indicated by the dashed arrow and then select which parameters to adjust from the parameter menu area 1006. Utilising the orbital touch controls in this manner significantly reduces the number of user input required to adjust parameters of video streams and edit video streams. Therefore the orbital controls provide an advantage over existing interfaces for touch screen devices which would required multiple touches to adjust multiple parameters.

Real-time or near real-time editing of video streams obtained from networked video cameras may find particular application with consumer orientated image capturing apparatus which have wireless connectivity capabilities. For instance, in an example scenario of a sports event or music concert, spectators' video capturing devices such as smartphones and camcorders may be connected to a local area network and the captured video streamed to a server whereby a user of a computing device such as the event organiser can form an edited video stream without investing in a number of video capturing apparatus. This ability to consolidate captured video in a single location and produce an edited video stream via use of orbital touch controls therefore allows a low-cost implementation of a multiple-point video capture and editing system.

Figure 11:
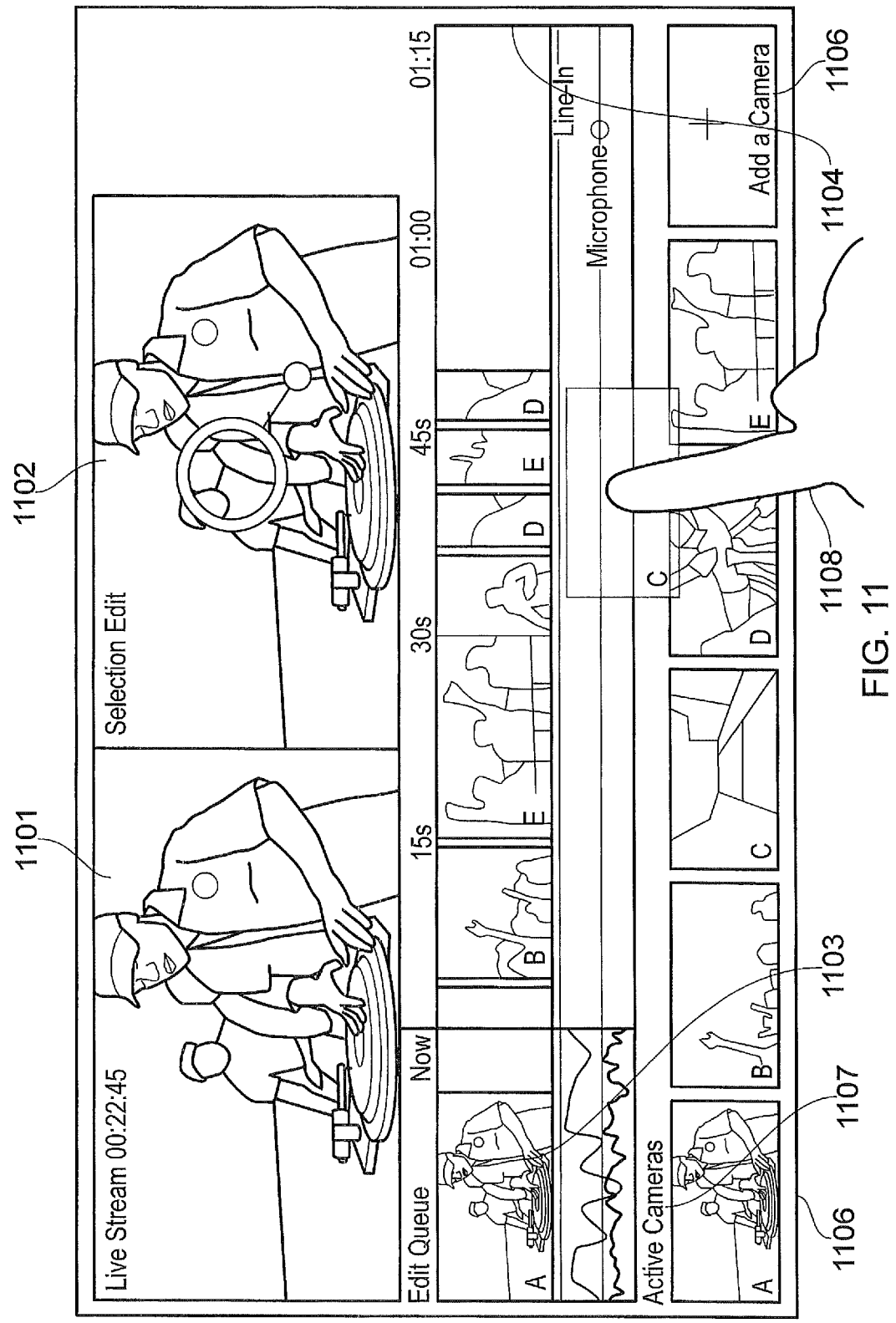
FIG. 11 provides an illustration of an example parameter control interface in accordance with the present disclosure.

FIG. 11 provides an illustration of the user interface of FIG. 10 and the orbital touch control when it is being used to perform real-time editing of video captured of an event by a plurality of cameras. The live edited stream currently being provided to viewers is displayed at 1101 and the video footage which is currently being edited ready for inclusion in the edited video stream is displayed at 1102. To perform the editing of the video an orbital touch control is used to adjust parameters of the video. The queue of videos streams from the available cameras that have been combined to produce the edited video stream are shown in the edit queue 1103, along the side of which a time index is shown, where the size of the video stream in the edit queue may indicate or determine the time for which that stream will be shown in the edited video stream. Towards the end of the bar 1103 a blank portion is shown which represents time in the edited video stream which has yet to be filled with video footage from a particular camera. As in FIG. 10, additional video feeds can be added via the "Add Camera" button 1105 where the addition video feeds available may varying according to which cameras are operational. For example, in a scenario where the cameras are wirelessly networked personal video cameras not all owners of video cameras will be recording at the same time so only the video streams from those cameras which are currently recording may be shown. If Camera A ceases to record the video stream 1106 may be removed from the active camera bar and a new stream added or the space corresponding to camera left blank for example. Each video stream from the active camera bar 1107 may be added to the edit queue 1103 as shown by the hand 1108 dragging the video stream from camera C to the edit queue.

The user interface illustrated in FIG. 11 provides a simple but efficient interface for performing real-time or near real-time video editing. The intuitive nature of the orbital touch control and the ease with which video streams may be introduced into the edited video stream allow a user to control with a single hand a live edited video stream. This is contrast to existing approaches and graphical user interfaces which require a complex system of controls and inputs means in order to perform real-time editing of videos. Accordingly, the graphical user interface of FIG. 11 may be provided on a conventional tablet computing device or smart phone therefore providing a low costs real-time video editing tool.

Real-Time Apparatus Control

The real-time video editing application described above uses post-processing of captured video to achieve an edited video stream. However, as previously described some parameters associated with captured images may not be able to be altered via the use of post processing. For example, aperture, focus, shutter speed etc. associated with images may only be able to be adjusted via adjustment of the parameters of the image capturing apparatus themselves. Accordingly, in an example analogous to that that described above with regards to real-time video editing, an interface based around the orbital touch control may be provided to remotely adjust the parameters of video capturing apparatus in real-time in order to form an edited video stream. A system in which remote real-time image capturing apparatus control is performed may have a similar topology to that depicted in FIG. 9.

The operation of the system of FIG. 9 will be substantially similar whether post processing or apparatus parameter control is implemented, however, for apparatus parameter control, signalling will be required to be transmitted between the computing device and the image capturing apparatus. Such control signalling would provide an indication of the desired parameters to the image capturing apparatus and the image capturing apparatus would then be required to perform the parameter adjustment using any means available to it. The software running on the computing device may have knowledge of the video capturing apparatus application programming interface (API) and therefore convert the parameter adjustment instructions provided via the orbital touch controls into a form that can be interpreted by the cameras. The video editing interface may be supplied to the computing device with a standard set of camera APIs and if further APIs are required these may be download via the Internet from either a central database, a camera manufacturer's website or acquired via a removable storage medium. Alternatively, the computing device may send a "change request" or "parameter adjustment request"

to a remote image capturing apparatus via a network to indicate that a change in capture parameters has been requested. If present, an operator of the remote image capturing apparatus may be informed of the request via an operator interface such as a touch screen display for example, and then be presented with the option to accept or reject the proposed parameter change. Once accepted, the camera parameters may be automatically adjusted corresponding to the request. If the request is rejected, a feedback message may be returned to the computing device and in some examples communication may take place between the operator and the requester via the network in order to negotiate the parameter adjustment.

Although in the previous examples post-processing based parameter adjustment and video editing, and image capturing apparatus based parameter adjustment have been described separately, these capabilities may also be combined in a system where all parameters associated with images may be adjusted via the use of orbital touch controls in a single unified interface. For instance, any parameter(s) may be selected for adjustment via the use of orbital touch controls and the software running on the computing device determines, via a look up table for example, whether control signals to perform the parameter adjustment are required to be sent to the server, imaging capturing apparatus or remain with the computing device to be processed by the processor module and the format in which they must be sent.

Post processing video editing and video editing via real-time image capturing parameter adjustment each provide varying benefits. For example, when using a post processing approach clean video streams may be captured and then the edited stream formed from a copy of the clean streams such that an unedited version of a scene is also obtained. In contrast with apparatus parameter adjustment the originally captured video stream is affected such that a clean unadjusted stream is not obtained. However, this may reduce memory requirements because a second clean version of each video stream may not be required to be stored, expand the number of parameters that can be adjusted and reduce processing requirements because post-processing of video streams is not required.

Intelligent Image Selection

In recent years the sophistication of digital image capturing devices has increased substantially both in terms of the quality of the captured images and the functionality of the devices. For instance, many image capturing devices, whether they be dedicated image capturing devices or those incorporated in to mobile phones, now have a "burst mode" in which a plurality of images are captured in quick succession. Such modes are often utilised when attempting to capture images of fast moving objects such that the probability of obtaining a desired image is increased. The use of burst modes results in a large number of captured images which the user is required to browse in order to establish which of the images they wish to select and keep. Such a process can be extremely time consuming and, if performed on the image capturing device itself, may be difficult to differentiate between similar images because of the small dimensions of the screen on which the images are displayed. These problems may be partially addressed by performing selection of the images on a larger display and or utilising a larger memory to store the captured images such that deletion is not required until the images can be viewed on a large display. However, the number of capture images may still be large resulting in user fatigue whilst viewing the images and poor selection of the appropriate captured images. Accordingly it would be desirable to have a user interface which simplifies the process of selecting images from an array of burst captured images or a large number of unrelated images.

Figure 12:
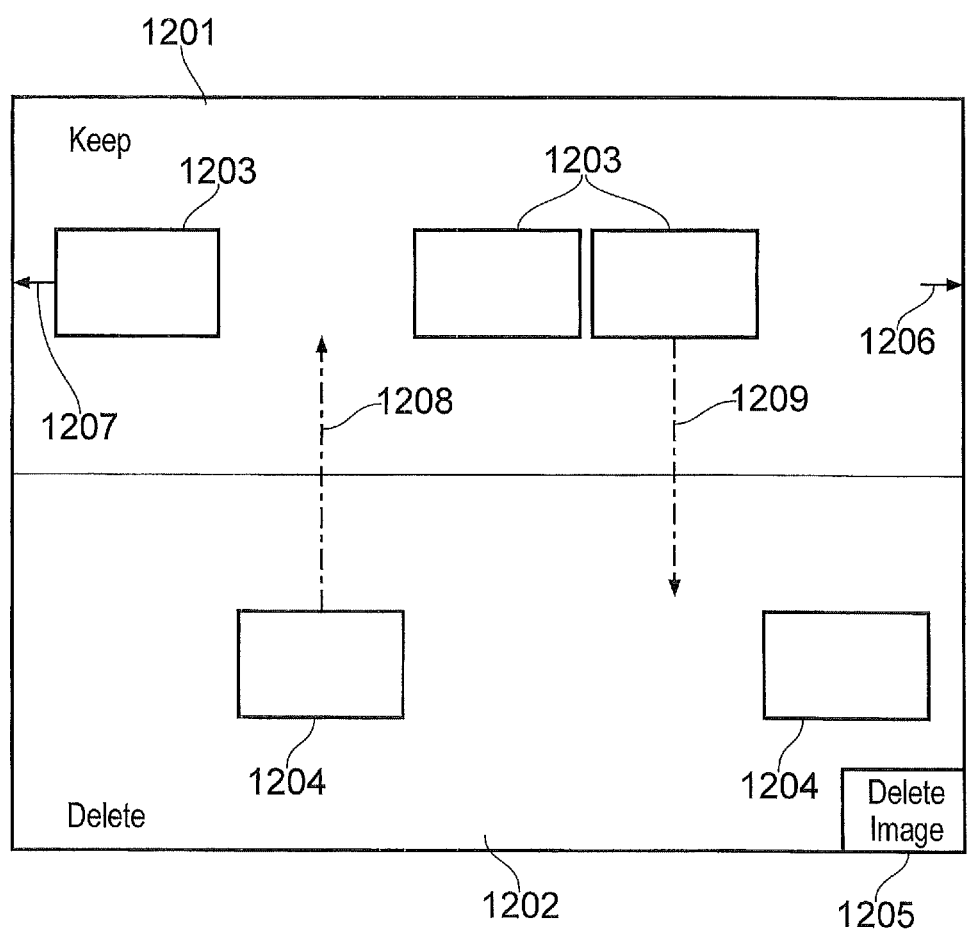
FIG. 12 provides an illustration of a image selection too in accordance with the present disclosure.

FIG. 12 provides an illustration of an example user interface that may be displayed on a touch sensitive or conventional screen and that may used to aid user selection of images from an array of captured images. The screen of the device on which the images are being viewed in divided into two main areas termed the "keep" area 1201 and "delete" area 1202 where images 1203 in the "keep" area are intended to be kept and images 1204 in the "delete" area are intended to be deleted. The images in the "delete" area may then be deleted by the use of a button such as button 1205. The array of images may be scrolled to the right and left by arrows 1206 and 1207, respectively, such that it is not necessary display all captured images on the screen simultaneously whilst still allowing access to the images.

When first displaying the areas 1201 and 1202 they are populated with captured images in an automated but intelligent manner by the processor module of the device on which they are displayed. This may be done by the processor module analysing one or more of the characteristics associated with the images against a set of predefined or user defined rules. In one example, by performing edge detection on the captured images it may be possible to establish whether a captured image is in focus. For instance, if edges in a captured image do not meet a sharpness criterion then the processor may determine that the image is out of focus and should be initially positioned in the "delete" area. Similarly, if the contrast of the image is above or below a threshold it may be determined that an image is either over or under exposed and should therefore be positioned in the delete area. This intelligent population of the areas provides an initial sort of the images which helps draws a user's attention to those images which are suitable for deletion and those suitable of to keep, thus increasing the efficiency of the user selection process. In some circumstances the automated selection process may be unable to accurately determine whether an image is suitable for deletion, accordingly images which are suitable for deletion may be placed in the keep area and vice versa. To account for this situation the graphical user interface allows the user to move images between the areas as indicated by the arrows 1208 and 1209. Such movement may be performed by dragging and dropping using a mouse or simply dragging when performed via a touch screen.

The intelligent selection of images reduces the cognitive burden on the user when attempting to select which of a plurality of images may be deleted and keep. Accordingly, more accurate selection by the user may be achieved. Furthermore, the initial intelligent sorting the images draws the attention of the user to the images which have a higher probability of being suitable for deletion, therefore reducing the likelihood that an image will be deleted in error.

Intelligent Timeline and Newsfeed Compilation

The increasing membership of social networks and the resulting increase in the sharing of photographs and other media has led to a high volume of content being added to social networks and other online communities. The volume and the variety of sources from which the content originates may lead to the process of a user attempting to select the data which is relevant to them becoming problematic. One commonly used approach is for a member of a social network to specify other members with which they wish to receive or be alerted to content from. Although this allows the content which is chosen to be presented to users to be more accurately selected, this relies on a significant element of user interaction and also may not identify other members of social networks which they may unknowing socialise with or have similar interests. Likewise, due to the volume of content available on social networks it is not practical for a user to sift through the images and other content available to them in order to extract useful information. For instance, if a user has been to a music concert/event but does not have knowledge of the musicians whom they saw, attempting to identify from content uploaded to social network sites the musicians whom they saw is likely to be a time consuming process.

In one example a server which analyses metadata of content uploaded to social networking sites is provided. The server is arranged to select content which is relevant to a user and presents such content to the user in the form of a timeline or a newsfeed. The server may select content based on characteristics such as locations which are similar to those of the user for example. For instance, in the case of an event during which the user logged onto the social networking site from a specific location at a specific time, the server may identify the event form the location information and then select content which has metadata indicating a similar location and time and present such content to a user via a timeline, where the timeline may include content from previous related events. In this manner the user is presented with relevant data without having to search for and select the content manually. In some examples, the user may upload content such as pictures that lack metadata onto a social networking site. In this case procedures such as facial recognition and or audio recognition may be performed on the content such that the relevant persons in the content can be identified. Once the identities of the persons are known then once again relevant content such as photos uploaded by the identified persons can be selected by the application for presentation to the user.

In another example, profiles of users may be gradually assembled over time via the collection of data extracted from uploaded photos and posts and behavioural patterns. For instance a user may be a member of football team along with 10 other persons and over a period of time content relating to the football team may be uploaded to a social networking site. From this content a pattern of the users attending a same venue at a specified time each week may be established. Then from game fixtures or content posted on the Internet or social networking sites the server may accurately establish that the users are members of football team. Content related to the football team can then be displayed to the users in the form a "Football Team" timeline or newsfeed. In this manner content which is relevant to a user has been provided to the user with little or no direct user interaction.

Figure 13:
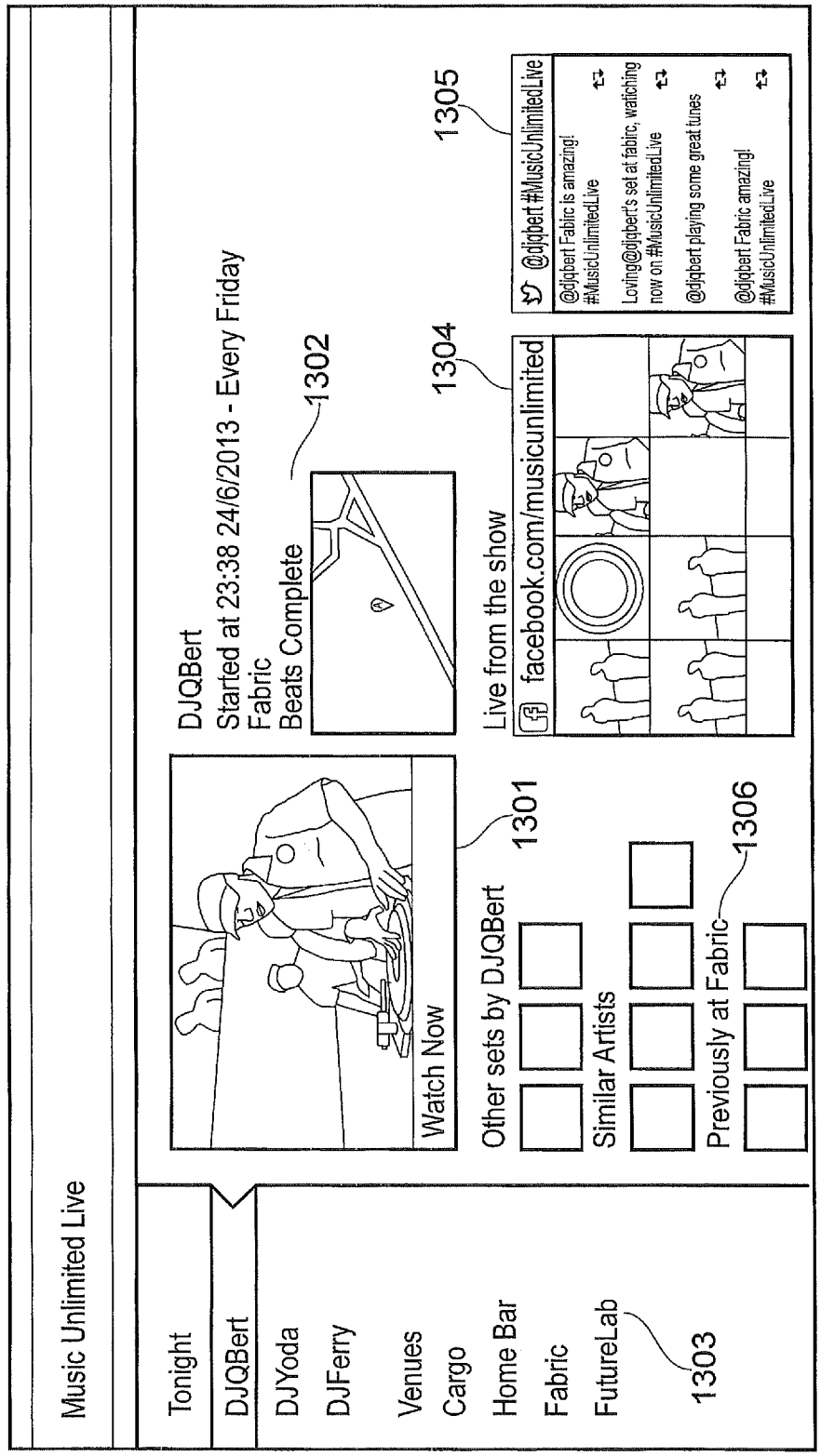
FIG. 13 provides an illustration of a media content feed interface in accordance with the present disclosure.

FIG. 13 provides an example graphical user interface that may be used as an element of a system configured to address the problems of selecting content which is relevant to a user from a large volume of content. In FIG. 13 a user is watching a live video stream of a music event 1301 and via face recognition or metadata associated with the live stream the identity of the performing artist is established. From this identity information related to the artist such as the location of the event 1302, and other performers at the event 1303 may be retrieved from the internet and displayed to the user. In addition to information gathered from conventional information sources on the internet, via the use of the location of the event the system may obtain recently uploaded images 1304 to a social networking site that have been tagged with the location of the event or comments 1305 which have been tagged with the relevant location or identity of the artist. Lastly information on other artists which the users who have uploaded relevant images have seen may be used to present recommendations of similar artists and previous and upcoming events 1306 to the user watching the live stream.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

The following numbered clauses provide further aspects and examples of the present disclosure:

1. A computing device, comprising
a processor module configured to execute program code to provide useable functions of the computing device, and
a touch sensitive screen formed from a touch sensing input module and a display module and configured
to display a graphical representation of a user interface and
to provide the processor module with signals representing interaction with the touch sensitive screen, the processor module being configured
to control the graphical representation of the user interface in response to the signals representing the interaction,
wherein the user interface includes an orbital touch control, the orbital touch control being configured to move in an angular direction and in a radial direction relative to a reference point in response to signals representing interaction with the orbital touch control, and the processor module is configured to generate, in response to the signals representing the interaction with the orbital touch control, control signals for controlling parameters associated with data received at the computing device, the control signals including an indication of values of a first and of a second of the parameters, the value of the first parameter being dependent on an angular position of the orbital touch control relative to the reference point and the value of a second parameter being dependent on a radial position of the orbital touch control relative to the reference point.

2. A computing device according to clause 1, wherein the data includes one or more images captured by one or more image capturing devices and the parameters correspond to first and second parameters of the image capturing devices, the image capturing devices being configured to generate and to communicate to the computing device signals representing the captured images, and the computing device is configured to receive the signals representing the captured images and transmit the control signals to the image capturing devices, wherein the image capturing devices are configured to adjust the first and second parameters of the image capturing device dependent on the control signals.

3. A computing device according to clause 1, wherein the data includes one or more images and the processor module is configured to adjust the first and second parameters of the one or more images dependent on the control signals.

4. A computing device according to clauses 2 or 3, wherein the control signals include an indication of a predetermined temporal period over which the parameters are to be adjusted.

5. A computing device according to clause 4, wherein the user interface comprises a second orbital touch control configured to move relative to the reference point, the angular position of the second orbital touch control relative to the reference point representing a pre-adjustment value of the first parameter and the radial position of the orbital touch control relative to the reference point representing a pre-adjustment value of the second parameter.

6. A computing device according to any of clauses 2 to 5, wherein the one or more images form one or more video streams.

7. A computing device according to any of clauses 2 to 6, wherein the reference point forms a central point of an aperture in the user interface and a portion of one of the one or more images is displayed within the aperture, the displayed portion having parameters adjusted in accordance the parameter values indicated in the control signals.

8. A computing device according to clause 6, wherein the processor module is configured to splice two video streams and the parameters are associated with the spicing of the two video streams.

9. A video processing system, comprising
a video camera configured to generate video signals representing video captured by the video camera,
a computing device comprising a touch sensitive screen configured to display a graphical representation of a user interface and to provide a processor module with signals representing user interaction with the touch sensitive screen, the processor module being configured to control the graphical representation of the user interface in response to the signals representing the interaction
a server configured to receive the video signals from the video camera and provide at least some of the video signals to the computing device for reproduction of at least some of the images on the touch sensitive screen
wherein the user interface includes an orbital touch control, the orbital touch control being configured to move in an angular direction and in a radial direction relative to a reference point in response to signals representing interaction with the orbital touch control, and the processor module is configured to generate, in response to the signals representing the interaction with the orbital touch control, control signals for controlling parameters associated with the video signals, the control signals including an indication of values of a first and of a second of the parameters, and the value of the first parameter being dependent on an angular position of the orbital touch control relative to the reference point and the value of a second parameter being dependent on a radial position of the orbital touch control relative to the reference point.

10. A video processing system according to clause 9 wherein the computing device is configured to transmit the control signals to the server, and the server is configured to adjust the parameters of the captured video dependent on the control signals and to provide an edited video stream to a client, the edited video stream including at least some of the captured video whose parameters have been adjusted.

11. A video processing system according to clause 9, wherein the video camera is configured for manual parameter adjustment by an operator, and the computing device is configured to transmit the control signals to the server, the server being configured to provide a change request representing the control signals to the video camera and the video camera is configured to present the change request to the operator via an operator interface.

12. A video processing system according to clause 9, wherein the system comprises a plurality of video cameras and the server is configured to receive video signals from the video cameras and provide at least some of the video signals to the computing device for reproduction of at least some of the images on the touch sensitive screen and wherein the computing device is configured to transmit the control signals to the server, and the server is configured to adjust the parameters of the captured video of one or more of the plurality of video cameras dependent on the control signals and to provide an edited video stream to a client, the edited video stream including at least some of the captured video whose parameters have been adjusted.

13. A method of generating of control signals for adjusting a first parameter and a second parameter associated with data, the method comprising
displaying a graphical representation of a user interface on a touch sensitive screen,
providing a processor module with signals representing interaction with the touch sensitive screen,
controlling the graphical representation of the user interface in response to the signals representing the interaction,
wherein the user interface includes an orbital touch control, the orbital touch control being configured to move in an angular direction and in a radial direction relative to a reference point in response to signals representing user interaction with the orbital touch control, and the method including
generating, in response to the signals representing the interaction with the orbital touch control, control signals for controlling parameters associated with data received at the computing device, the control signals including an indication of values of a first and of a second of the parameters, and the value of the first parameter being dependent on an angular position of the orbital touch control relative to the reference point and the value of a second parameter being dependent on a radial position of the orbital touch control relative to the reference point.

14. Circuitry for a computing device, the circuitry comprising
processor circuitry configured to execute program code to provide useable functions of the computing device, and
touch sensitive screen circuitry formed from touch sensing input circuitry and display circuitry and configured
to display a graphical representation of a user interface and
to provide the processor circuitry with signals representing interaction with the touch sensitive screen circuitry, the processor circuitry being configured
to control the graphical representation of the user interface in response to the signals representing the interaction,
wherein the user interface includes an orbital touch control, the orbital touch control being configured to move in an angular direction and in a radial direction relative to a reference point in response to signals representing interaction with the orbital touch control, and the processor module is configured to generate, in response to the signals representing the interaction with the orbital touch control, control signals for controlling parameters associated with data received at the computing device circuitry, the control signals including an indication of values of a first and of a second of the parameters, the value of the first parameter being dependent on an angular position of the orbital touch control relative to the reference point and the value of a second parameter being dependent on a radial position of the orbital touch control relative to the reference point.

15. Circuitry for a video processing system, the circuitry comprising
video camera circuitry configured to generate video signals representing captured video, computing device circuitry comprising touch sensitive screen circuitry configured to display a graphical representation of a user interface and to provide processor circuitry with signals representing user interaction with the touch sensitive screen circuitry, the processor circuitry being configured to control the graphical representation of the user interface in response to the signals representing the interaction server circuitry configured to receive the video signals from the video camera circuitry and provide at least some of the video signals to the computing device circuitry for reproduction of at least some of the images by the touch sensitive screen circuitry wherein the user interface includes an orbital touch control, the orbital touch control being configured to move in an angular direction and in a radial direction relative to a reference point in response to signals representing interaction with the orbital touch control, and the processor circuitry is configured to generate, in response to the signals representing the interaction with the orbital touch control, control signals for controlling parameters associated with the video signals, the control signals including an indication of values of a first and of a second of the parameters, and the value of the first parameter being dependent on an angular position of the orbital touch control relative to the reference point and the value of a second parameter being dependent on a radial position of the orbital touch control relative to the reference point.

The invention claimed is:

1. A computing device, comprising
a processor configured to execute program code to provide useable functions of the computing device, and
a touch sensitive screen formed from a touch sensing input device and a display and configured
to display a graphical representation of a user interface and
to provide the processor with signals representing interaction with the touch sensitive screen, the processor being configured
to control the graphical representation of the user interface in response to the signals representing the interaction,
wherein the user interface includes an orbital touch control, the orbital touch control being displayed as part of the graphical representation of the user interface configured to move in an angular direction and in a radial direction relative to a reference point in response to signals representing a drag interaction with the orbital touch control, and the processor is configured to generate, in response to the signals representing the interaction with the orbital touch control, control signals for controlling parameters of at least two different functions of the computing device, the control signals including an indication of values of a first and of a second of the parameters, the value of the first parameter being dependent on an angular position of the orbital touch control relative to the reference point and the value of a second parameter being dependent on a radial position of the orbital touch control relative to the reference point.

2. A computing device as claimed in claim 1, wherein
images are captured by one or more image capturing devices and the parameters correspond to first and second parameters of the image capturing devices, the image capturing devices being configured to generate and to communicate to the computing device signals representing the captured images, and the computing device is configured to receive the signals representing the captured images and transmit the control signals to the image capturing devices, wherein the image capturing devices are configured to adjust the first and second parameters of the image capturing device dependent on the control signals.

3. A computing device as claimed in claim 2, wherein the control signals
include an indication of a predetermined temporal period over which the parameters are to be adjusted.

4. A computing device as claimed in claim 3, wherein the user interface comprises a
second orbital touch control configured to move relative to the reference point, the angular position of the second orbital touch control relative to the reference point representing a pre-adjustment value of the first parameter and the radial position of the orbital touch control relative to the reference point representing a pre-adjustment value of the second parameter.

5. A computing device as claimed in claim 2, wherein the one or more images form one or more video streams.

6. A computing device as claimed in claim 5, wherein the processor is
configured to splice two video streams and the parameters are associated with the splicing of the two video streams.

7. A computing device as claimed in claim 2, wherein the reference point forms a central point of an aperture in the user interface and a portion of one of the one or more images is displayed within the aperture, the displayed portion having parameters adjusted in accordance the parameter values indicated in the control signals.

8. A computing device as claimed in claim 1, wherein
the processor is configured to adjust the first and second parameters of one or more images dependent on the control signals.

9. The computing device of claim 1, wherein the at least two different functions include at least two of a hue adjustment, a saturation adjustment, an aperture adjustment, and a focus adjustment.

10. A video processing system, comprising:
a video camera configured to generate video signals representing video captured by the video camera;
a computing device comprising a touch sensitive screen configured to display a graphical representation of a user interface and to provide a processor with signals representing user interaction with the touch sensitive screen, the processor module being configured to control the graphical representation of the user interface in response to the signals representing the interaction; and
a server configured to receive the video signals from the video camera and provide at least some of the video signals to the computing device for reproduction of at least some of the images on the touch sensitive screen
wherein the user interface includes an orbital touch control, the orbital touch control being displayed as part of the graphical representation of the user interface configured to move in an angular direction and in a radial direction relative to a reference point in response to signals representing interaction with the orbital touch control, and the processor is configured to generate, in response to the signals representing a drag interaction with the orbital touch control, control signals for controlling parameters of at least two different functions, the control signals including an indication of values of a first parameter and of a second parameter of the parameters, and the value of the first parameter being dependent on an angular position of the orbital touch control relative to the reference point and the value of a second parameter being dependent on a radial position of the orbital touch control relative to the reference point.

11. A video processing system as claimed in claim 10 wherein the computing device is
configured to transmit the control signals to the server, and the server is configured to adjust the parameters of the captured video dependent on the control signals and to provide an edited video stream to a client, the edited video stream including at least some of the captured video whose parameters have been adjusted.

12. A video processing system as claimed in claim 10, wherein the video camera
is configured for manual parameter adjustment by an operator, and the computing device is configured to transmit the control signals to the server, the server being configured to provide a change request representing the control signals to the video camera and the video camera is configured to present the change request to the operator via an operator interface.

13. A video processing system as claimed in claim 10, wherein the system
comprises a plurality of video cameras and the server is configured to receive video signals from the video cameras and provide at least some of the video signals to the computing device to reproduce at least some of the images on the touch sensitive screen and wherein the computing device is configured to transmit the control signals to the server, and the server is configured to adjust the parameters of the captured video of one or more of the plurality of video cameras dependent on the control signals and to provide an edited video stream to a client, the edited video stream including at least some of the captured video whose parameters have been adjusted.

14. A video processing system of claim 10, wherein the at least two different functions include at least two of a hue adjustment, a saturation adjustment, an aperture adjustment, and a focus adjustment.

15. A method of generating of control signals for adjusting a first parameter and a second parameter associated with data, the method comprising:
displaying a graphical representation of a user interface on a touch sensitive screen,
providing a processor with signals representing interaction with the touch sensitive screen,
controlling the graphical representation of the user interface in response to the signals representing the interaction,
wherein the user interface includes an orbital touch control, the orbital touch control being displayed as part of the graphical representation of the user interface configured to move in an angular direction and in a radial direction relative to a reference point in response to signals representing a drag interaction with the orbital touch control, and the method including
generating, in response to the signals representing the interaction with the orbital touch control, control signals for controlling parameters of at least two different functions of the computing device, the control signals including an indication of values of a first and of a second of the parameters, and the value of the first parameter being dependent on an angular position of the orbital touch control relative to the reference point and the value of a second parameter being dependent on a radial position of the orbital touch control relative to the reference point.

16. The method of claim 15, wherein the at least two different functions include at least two of a hue adjustment, a saturation adjustment, an aperture adjustment, and a focus adjustment.

17. Circuitry for a computing device, the circuitry comprising
processor circuitry configured to execute program code to provide useable functions of the computing device, and
touch sensitive screen circuitry formed from touch sensing input circuitry and display circuitry and configured
to display a graphical representation of a user interface and
to provide the processor circuitry with signals representing
interaction with the touch sensitive screen circuitry, the processor circuitry being configured
to control the graphical representation of the user interface in response to the signals representing the interaction,
wherein the user interface includes an orbital touch control, the orbital touch control being displayed as part of the graphical representation of the user interface configured to move in an angular direction and in a radial direction relative to a reference point in response to signals representing a drag interaction with the orbital touch control, and the processor circuitry is configured to generate, in response to the signals representing the interaction with the orbital touch control, control signals for controlling parameters of at least two different functions of the computing device circuitry, the control signals including an indication of values of a first and of a second of the parameters, the value of the first parameter being dependent on an angular position of the orbital touch control relative to the reference point and the value of a second parameter being dependent on a radial position of the orbital touch control relative to the reference point.

18. The circuitry of claim 17, wherein the at least two different functions include at least two of a hue adjustment, a saturation adjustment, an aperture adjustment, and a focus adjustment.

19. Circuitry for a video processing system, the circuitry comprising
video camera circuitry configured to generate video signals representing captured video,
computing device circuitry comprising touch sensitive screen circuitry configured to display a graphical representation of a user interface and to provide processor circuitry with signals representing user interaction with the touch sensitive screen circuitry, the processor circuitry being configured to control the graphical representation of the user interface in response to the signals representing the interaction
server circuitry configured to receive the video signals from the video camera circuitry and provide at least some of the video signals to the computing device circuitry for reproduction of at least some of the images by the touch sensitive screen circuitry
wherein the user interface includes an orbital touch control, the orbital touch control being displayed as part of the graphical representation of the user interface configured to move in an angular direction and in a radial direction relative to a reference point in response to signals representing a drag interaction with the orbital touch control, and the processor circuitry is configured to generate, in response to the signals representing the interaction with the orbital touch control, control signals for controlling parameters of at least two different functions of the computing device, the control signals including an indication of values of a first parameter and of a second parameter of the parameters, and the value of the first parameter being dependent on an angular position of the orbital touch control relative to the reference point and the value of a second parameter being dependent on a radial position of the orbital touch control relative to the reference point.

20. The circuitry of claim 19, wherein the at least two different functions include at least two of a hue adjustment, a saturation adjustment, an aperture adjustment, and a focus adjustment.

21. A non-transitory computer readable medium including a computer executable computer program providing computer executable instructions, which when loaded onto a computing device causes the computing device to perform the method according to claim 15.

22. The non-transitory computer readable medium of claim 21, wherein the at least two different functions include at least two of a hue adjustment, a saturation adjustment, an aperture adjustment, and a focus adjustment.

* * * * *